(12) United States Patent
Tomigashi

(10) Patent No.: US 7,893,639 B2
(45) Date of Patent: Feb. 22, 2011

(54) MOTOR CONTROL DEVICE

(75) Inventor: Yoshio Tomigashi, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/629,372

(22) Filed: Dec. 2, 2009

(65) Prior Publication Data

US 2010/0072929 A1 Mar. 25, 2010

Related U.S. Application Data

(63) Continuation of application No. 11/730,684, filed on Apr. 3, 2007.

(30) Foreign Application Priority Data

Apr. 7, 2006 (JP) .............................. 2006-106293

(51) Int. Cl.
*H02H 7/08* (2006.01)
(52) U.S. Cl. ................... 318/400.21; 318/721; 318/432
(58) Field of Classification Search ............ 318/400.21, 318/721, 432, 489, 808, 719, 727, 700, 702, 318/804
See application file for complete search history.

(56) References Cited

U.S. PATENT DOCUMENTS 5,701,066 A 12/1997 Matsuura et al.
7,002,318 B1 2/2006 Schulz
2004/0178764 A1* 9/2004 Kaku et al. .................. 318/716

FOREIGN PATENT DOCUMENTS

| EP | 1133050 | 9/2001 |
|---|---|---|
| EP | 1411629 | 4/2004 |
| EP | 1501185 | 1/2005 |
| EP | 1513250 | 3/2005 |
| JP | 11018499 | 1/1999 |
| JP | 2001025282 | 1/2001 |
| JP | 2002058281 | 2/2002 |
| JP | 2004064902 | 2/2004 |
| JP | 2005176458 | 6/2005 |

OTHER PUBLICATIONS

European Extended Search Report, dated Dec. 14, 2009.

* cited by examiner

*Primary Examiner*—Karen Masih
(74) *Attorney, Agent, or Firm*—NDQ&M Watchstone LLP

(57) ABSTRACT

A motor control device that includes a first speed estimator estimating the rotation speed of the rotor of a permanent-magnet synchronous motor and that controls the motor so that a first estimated rotation speed estimated by the first speed estimator follows the specified speed value further includes a second speed estimator that estimates the rotation speed of the rotor by an estimation method different from that used by the first speed estimator. The motor control device detects synchronization failure based on a comparison between a second estimated rotation speed estimated by the second speed estimator and the first estimated rotation speed or the specified speed value.

3 Claims, 11 Drawing Sheets

MOTOR CONTROL DEVICE

CROSS REFERENCE TO RELATED APPLICATIONS

This is a Continuation of U.S. patent application Ser. No. 11/730,684, filed Apr. 3, 2007, which application claims priority under 35 U.S.C. §119(a) to Japanese Pat. App. No. 2006-106293, filed on Apr. 7, 2006, both of which applications are hereby incorporated by reference in their entireties.

BACKGROUND OF THE INVENTION

1. Field of the Invention

The present invention relates to a motor control device for controlling the operation of a motor, and more particularly to a motor control device with a capability of detecting synchronization failure. The present invention also relates to a motor drive system incorporating such a motor control device.

2. Description of Related Art

There have conventionally been developed motor control devices (position-sensorless control devices) that estimate the rotor position of a motor without the use of a rotor position sensor and controls the motor based on the so estimated rotor position. In motor control devices of this type, an abrupt variation in the load of the motor may cause synchronization failure. If synchronization failure occurs, the motor may come to a standstill and become uncontrollable. Thus, techniques that can surely detect synchronization failure have been sought.

There have been proposed various techniques for detecting such synchronization failure. Many of them detect synchronization failure by paying attention to a lowering in power factor, or ineffective current, resulting from a current that does not flow in normal operation.

For example, JP-A-2001-025282 discloses a technique whereby synchronization failure is detected through comparison of the period of ineffective current and the period of its voltage in case of a standstill resulting from synchronization failure.

For another example, a technique is known whereby synchronization failure is detected when the deviation between the estimated speed as estimated by a speed estimator and the specified speed has remained equal to or greater than a predetermined value for a predetermined period or longer. These conventional techniques, however, have the disadvantage that, in particular conditions, they cannot detect synchronization failure satisfactorily (for example, they simply cannot detect synchronization failure at all).

Incidentally, JP-A-H11-018499 discloses a technique whereby synchronization failure is detected by estimating and constantly comparing the γ-axis and d-axis induction voltages that are generated as the rotor of a motor rotates. On the other hand, JP-A-2004-064902 discloses a technique whereby, to detect synchronization failure of a synchronous motor, the voltage to be specified is determined based on the motor generation coefficient and the specified excitation current, then a voltage correction amount is produced to make the specified excitation current and the actual excitation current equal, and then the voltage correction amount is compared with a predetermined value.

Thus, while, as described above, techniques that can surely detect synchronization failure have been sought in motor control devices that control a motor without the use of a rotor position sensor, none of the conventionally known techniques can satisfactorily meet the requirements.

SUMMARY OF THE INVENTION

According to one aspect of the present invention, a motor control device that includes a first speed estimator estimating the rotation speed of the rotor of a permanent-magnet synchronous motor and that controls the motor so that a first estimated rotation speed estimated by the first speed estimator follows a specified speed value further includes: a second speed estimator estimating the rotation speed of the rotor by an estimation method different from that used by the first speed estimator; and a synchronization failure detector detecting synchronization failure based on a second estimated rotation speed estimated by the second speed estimator and on the first estimated rotation speed or the specified speed value.

Specifically, for example, the synchronization failure detector may detect synchronization failure based on the ratio or deviation between the second estimated rotation speed and the first estimated rotation speed or the specified speed value.

According to another aspect of the present invention, a motor control device that includes a first speed estimator estimating the rotation speed of the rotor of a permanent-magnet synchronous motor and that controls the motor so that a first estimated rotation speed estimated by the first speed estimator follows a specified speed value further includes: a synchronization failure detector estimating, based on one or two of a first, a second, and a third state quantity, another of the first, second, and third state quantities and detecting synchronization failure based on the result of the estimation, the first state quantity being related to the motor voltage applied to the motor, the second state quantity being related to the rotation speed of the rotor, and the third state quantity being related to a motor current supplied to the motor.

Specifically, for example, let the axis parallel to the magnetic flux produced by the permanent magnet provided on the rotor be the d-axis, let the axis estimated, for control purposes, to correspond to the d-axis be the γ-axis, and let the axis estimated, for control purposes, to be perpendicular to the γ-axis be the d-axis, then the second state quantity may be represented by the first estimated rotation speed or the specified speed value, the synchronization failure detector may estimate as the first state quantity the d-axis component of the motor voltage based on the second state quantity alone or the second state quantity and the third state quantity represented by the measured current of the motor current or the specified current value to be followed by the measured current, and the synchronization failure detector detects synchronization failure based on the thus estimated d-axis voltage as estimated as the first state quantity.

Moreover, for example, the synchronization failure detector may detect synchronization failure based on the ratio or deviation between the estimated d-axis voltage and the specified d-axis voltage value to be followed by the d-axis component of the motor voltage.

Specifically, for example, let the axis parallel to the magnetic flux produced by the permanent magnet provided on the rotor be the d-axis, let the axis estimated, for control purposes, to correspond to the d-axis be the γ-axis, and let the axis estimated, for control purposes, to be perpendicular to the γ-axis be the d-axis, then the first state quantity may be represented by the specified d-axis voltage value to be followed by the d-axis component of the motor voltage, the second state quantity may be represented by the first estimated rotation speed or the specified speed value, and the synchronization failure detector estimates as the third state quantity the d-axis component of the motor current based on the first and second state quantities, and detects synchronization failure based on the thus estimated d-axis current as estimated as the third state quantity.

Moreover, for example, the synchronization failure detector may detect the synchronization failure based on the ratio or deviation between the estimated d-axis current and the d-axis component of the measured current or the specified d-axis current value to be followed by the d-axis component of the measured current, or based on a comparison between the estimated d-axis current and a predetermined value.

Specifically, for example, let the axis parallel to the magnetic flux produced by the permanent magnet provided on the rotor be the d-axis, let the axis estimated, for control purposes, to correspond to the d-axis be the γ-axis, and let the axis estimated, for control purposes, to be perpendicular to the γ-axis be the d-axis, then the first state quantity is represented by the specified d-axis voltage value to be followed by the d-axis component of the motor voltage, the synchronization failure detector estimates as the second state quantity a second estimated rotation speed, separate from the first estimated rotation speed, based on the first state quantity alone or the first state quantity and the third state quantity represented by the measured current of the motor current or the specified current value to be followed by the measured current, and the synchronization failure detector detects synchronization failure based on the second estimated rotation speed.

According to still another aspect of the present invention, a motor drive system includes: a motor; an inverter driving the motor; and one of the motor control devices described above that controls the motor by controlling the inverter.

DETAILED DESCRIPTION OF PREFERRED EMBODIMENTS

Hereinafter, the present invention will be described by way of specific embodiments with reference to the accompanying drawings. Among these drawings, such parts that appear more than once are identified with common reference designations, and in principle the description of any part, once given, will not be repeated. Likewise, throughout the drawings, the same symbols (such as θ and ω) are stuck to represent the same quantities. Moreover, to make the description simple, state quantities and the like are often referred to by their symbols alone; for example, the "estimated motor speed $\omega_e$" is sometimes referred to simply by "$\omega_e$", and these should be understood to represent the same thing.

First Embodiment

Figure 1:
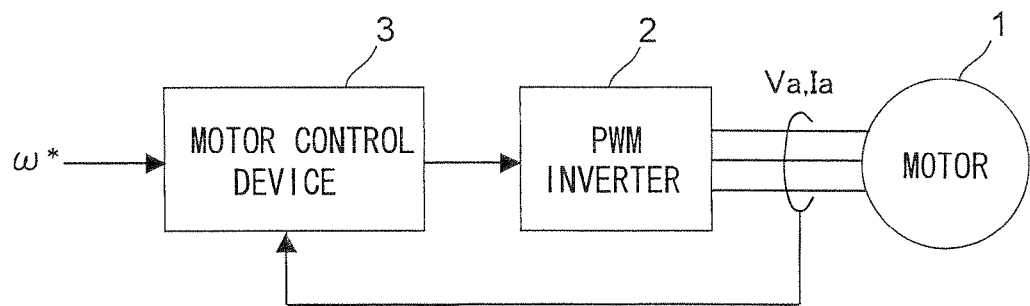
FIG. 1 is a block diagram showing an outline of the configuration of a motor drive system as a first embodiment of the present invention.

First, a first embodiment of the present invention will be described. FIG. 1 is a block configuration diagram of a motor drive system according to the first embodiment. The reference numeral 1 represents a three-phase permanent-magnet synchronous motor (hereinafter simply the "motor 1") having a permanent magnet on a rotor (unillustrated) and having an armature winding on a stator (unillustrated). In the following description, what are referred to simply by the "armature winding" and the "rotor" should be understood to mean the armature winding provided on the stator of the motor 1 and the rotor of the motor 1 respectively. The motor 1 is, for example, a salient-pole motor as exemplified by a interior permanent magnet synchronous motor; it may instead be a non-salient-pole motor.

The reference numeral 2 represents a PWM (pulse width modulation) inverter that, according to the rotor position of the motor 1, supplies three-phase alternating-current voltages, consisting of U-phase, V-phase, and W-phase voltages, to the armature winding of the motor 1. These voltages supplied to the armature winding of the motor 1 are collectively referred to as the motor voltage (armature voltage) Va, and the currents supplied from the inverter 2 to the armature winding of the motor 1 are collectively referred to as the motor current (armature current) Ia.

The reference numeral 3 represents a motor control device (position-sensorless control device) that, based on the motor current Ia, estimates the rotor position or the like of the motor 1, and feeds the PWM inverter 2 with a signal for rotating the motor 1 at a desired rotation speed. This desired rotation speed is fed, in the form of a specified motor speed value $\omega^*$, from an unillustrated CPU (central processing unit) or the like to a motor control device (in this embodiment, the motor control device 3).

Figure 2:
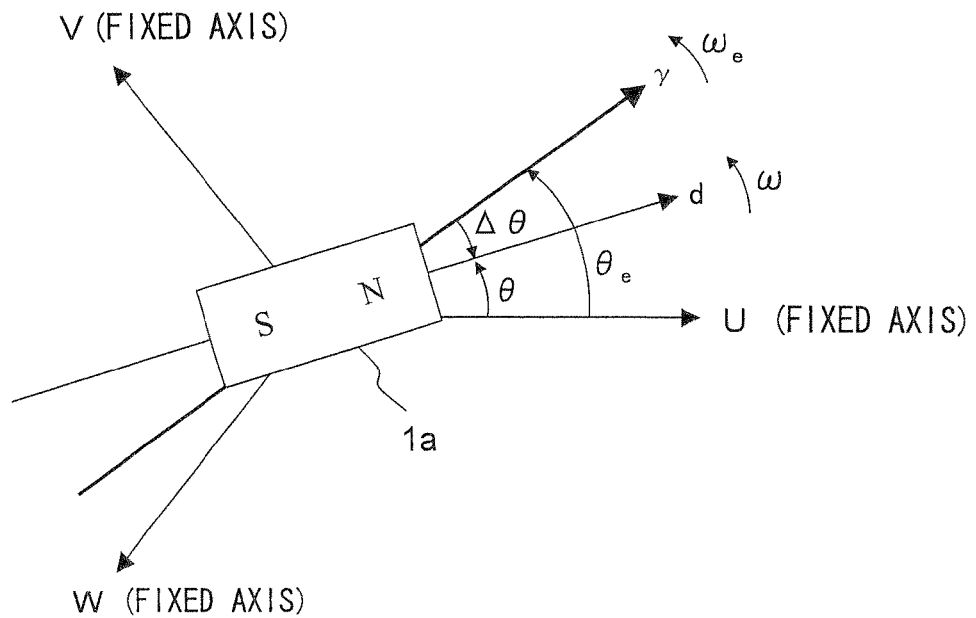
FIG. 2 is an analysis model diagram of the motor in first embodiment of the present invention.

FIG. 2 is an analysis model diagram of the motor 1. FIG. 2 shows the U-phase, V-phase, and W-phase armature winding fixed axes. The reference numeral 1a represents the permanent magnet constituting the rotor of the motor 1. In a rotating coordinate system that rotates at the same speed as the magnetic flux produced by the permanent magnet 1a, the direction of the magnetic flux produced by the permanent magnet 1a is referred to as the d-axis, and the axis estimated, for control purposes, as corresponding to the d-axis is referred to as the γ-axis. Moreover, although unillustrated, the axis having a phase leading the d-axis by an electrical angle of 90 degrees is referred to as the q-axis, and the axis estimated to have a phase leading the γ-axis by an electrical angle of 90 degrees is referred to as the δ-axis. The coordinate axes of the rotating coordinate system having the d- and q-axes as its coordinate axes are called the d-q axes (real axes). The rotating coordinate system (estimated rotating coordinate system) estimated for control purposes has the γ- and δ-axes as its coordinate axes, and its coordinate axes are called the γ-δ axes.

The d-q axes rotates, and its rotation speed (i.e., the rotation speed of the rotor of the motor 1) is called the real motor speed ω. The γ-δ axes also rotates, and its rotation speed is called the estimated motor speed $\omega_e$. With respect to the d-q axes in rotation, the phase of the d-axis at a given moment is represented, relative to the U-phase armature winding fixed axis, by θ (real rotor position θ). Likewise, with respect to the γ-δ axes in rotation, the phase of the γ-axis at that given moment is represented, relative to the U-phase armature winding fixed axis, by $\theta_e$ (estimated rotor position $\theta_e$). Then, the axis error Δθ between the d- and γ-axes (the axis error Δθ between the d-q axes and the γ-δ axes) is given by $\Delta\theta = \theta - \theta_e$. The values of ω*, ω, $\omega_e$, and $\omega_{2e}$ (described later) are given in electrical angular velocity.

In the following description, the γ-axis, δ-axis, d-axis, and q-axis components of the motor voltage Va are referred to as the γ-axis voltage $v_\gamma$, δ-axis voltage $v_\delta$, d-axis voltage $v_d$, and q-axis voltage $v_q$ respectively; the γ-axis, δ-axis, d-axis, and q-axis components of the motor current Ia are referred to as the γ-axis current $i_\gamma$, δ-axis current $i_\delta$, d-axis current $i_d$, and q-axis current $i_q$ respectively.

Moreover, in the following description, $R_a$ represents the motor resistance (the resistance of the armature winding of the motor 1); $L_d$ and $L_q$ represent the d-axis and q-axis inductances (the d-axis and q-axis components of the inductance of the armature winding of the motor 1); $F_a$ represents the armature flux linkage ascribable to the permanent magnet 1a. The values of $L_d$, $L_q$, $R_a$, and $F_a$ are determined at the time of the fabrication of the motor drive system, and are used by the motor control device to perform calculations. In the formulae presented in the course of the following description, s represents the Laplace operator.

Figure 3:
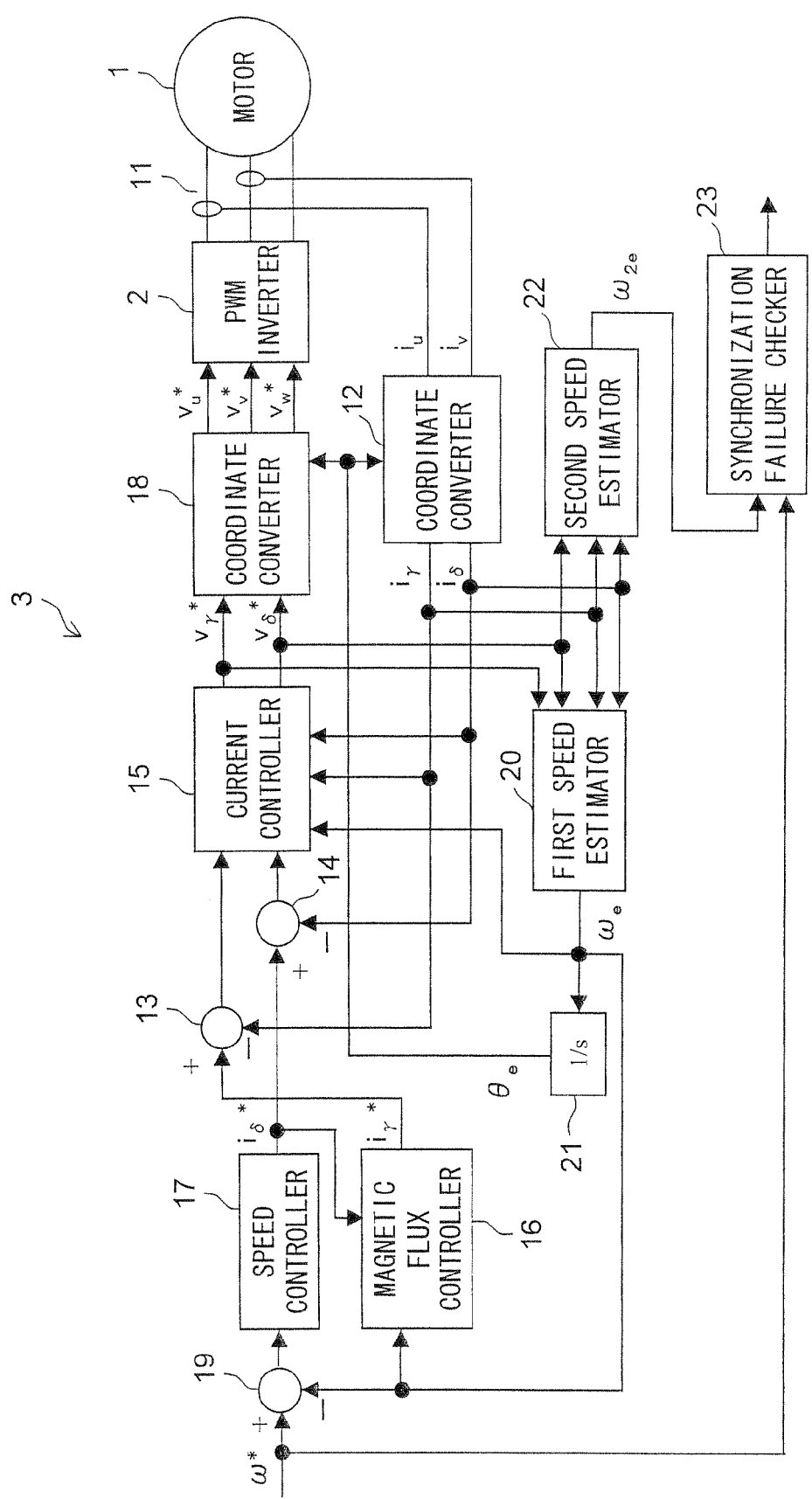
FIG. 3 is a configuration block diagram of the motor drive system shown in FIG. 1.

FIG. 3 is a configuration block diagram of the motor drive system, and shows the internal configuration of the motor control device 3 shown in FIG. 1. The motor control device 3 includes a current detector 11, a coordinate converter 12, a subtracter 13, a subtracter 14, a current controller 15, a magnetic flux controller 16, a speed controller 17, a coordinate converter 18, a subtracter 19, a first speed estimator 20, an integrator 21, a second speed estimator 22, and a synchronization failure checker 23. The different parts constituting the motor control device (3, and also 3a, 3b, and 3c described later) can freely use all the values produced within the motor control device (3, and also 3a, 3b, and 3c described later).

The current detector 11 is realized with, for example, Hall devices or the like, and detects the U-phase current (the current flowing through the U-phase part of the armature winding) $i_u$ and the V-phase current (the current flowing through the V-phase part of the armature winding) $i_v$ of the motor current Ia supplied from the PWM inverter 2 to the motor 1. The coordinate converter 12 receives the U-phase current $i_u$ and V-phase current $i_v$ detected by the current detector 11, and converts them into the γ-axis current $i_\gamma$ and δ-axis current $i_\delta$, based on the estimated rotor position $\theta_e$ fed from the integrator 21. The conversion here is performed according to formula (1) below.

$$\begin{bmatrix} i_\gamma \\ i_\delta \end{bmatrix} = \sqrt{2}\begin{bmatrix} \sin(\theta_e + \pi/3) & \sin\theta_e \\ \cos(\theta_e + \pi/3) & \cos\theta_e \end{bmatrix}\begin{bmatrix} i_u \\ i_v \end{bmatrix} \quad (1)$$

The first speed estimator 20 estimates and outputs the estimated motor speed $\omega_e$ (first estimated rotation speed). The method by which the estimated motor speed $\omega_e$ is estimated will be described in detail later, after the description of the fourth embodiment. The integrator 21 integrates the estimated motor speed $\omega_e$ estimated by the first speed estimator 20, and thereby calculates the estimated rotor position $\theta_e$.

The subtracter 19 subtracts from the specified motor speed value ω* the estimated motor speed $\omega_e$ fed from the first speed estimator 20, and outputs the result of the subtraction (speed error). The speed controller 17, based on the subtraction result (ω−$\omega_e$) from the subtracter 19, produces the specified δ-axis current value $i_\delta^*$. This specified δ-axis current value $i_\delta^*$ represents the current to be followed by the δ-axis current $i_\delta$, which is the δ-axis component of the motor current Ia. The magnetic flux controller 16 outputs the specified γ-axis current value $i_\gamma^*$; meanwhile, as necessary, the specified δ-axis current value $i_\delta^*$ and the estimated motor speed $\omega_e$ are referred to. The specified γ-axis current value $i_\gamma^*$ represents the current to be followed by the γ-axis current $i_\gamma$, which is the γ-axis component of the motor current Ia.

The subtracter 13 subtracts from the specified γ-axis current value $i_\gamma^*$ outputted from the magnetic flux controller 16 the γ-axis current $i_\gamma$ outputted from the coordinate converter 12, and thereby calculates the current error ($i_\gamma^* - i_\gamma$). The subtracter 14 subtracts from the specified δ-axis current value $i_\delta^*$ outputted from the speed controller 17 the δ-axis current $i_\delta$ outputted from the coordinate converter 12, and thereby calculates the current error ($i_\delta^* - i_\delta$).

The current controller 15 receives the current errors calculated by the subtracters 13 and 14, the γ-axis current $i_\gamma$ and δ-axis current $i_\delta$ from the coordinate converter 12, and the estimated motor speed $\omega_e$ from the first speed estimator 20, and calculates and outputs the specified γ-axis voltage value $v_\gamma^*$ to be followed by the γ-axis voltage $v_\gamma$ and the specified δ-axis voltage value $v_\delta^*$ to be followed by the δ-axis voltage $v_\delta$ such that the γ-axis current $i_\gamma$ follows the specified γ-axis current value $i_\gamma^*$ and in addition that the δ-axis current $i_\delta$ follows the specified δ-axis current value $i_\delta^*$.

Based on the estimated rotor position $\theta_e$ fed from the integrator 21, the coordinate converter 18 performs reverse conversion on the specified γ-axis voltage value $v_\gamma^*$ and specified δ-axis voltage value $v_\delta^*$, and thereby produces specified three-phase voltage values consisting of a specified U-phase voltage value $v_u^*$, a specified V-phase voltage value $v_v^*$, and a specified W-phase voltage value $v_w$ representing the U-phase, V-phase, and W-phase components of the motor voltage Va. The coordinate converter 18 then outputs these specified three-phase voltage values to the PWM inverter 2.

The reverse conversion here is performed according to formula (2) consisting of two equations below.

$$\begin{bmatrix} v_u^* \\ v_v^* \end{bmatrix} = \sqrt{\frac{2}{3}} \begin{bmatrix} \cos\theta_e & -\sin\theta_e \\ \cos(\theta_e - 2\pi/3) & -\sin(\theta_e - 2\pi/3) \end{bmatrix} \begin{bmatrix} v_\gamma^* \\ v_\delta^* \end{bmatrix} \quad (2)$$

$$v_w^* = -(v_u^* + v_v^*)$$

Based on the specified three-phase voltage values ($v_u^*$, $v_v^*$ and $v_w^*$), which represent the voltages to be applied to the motor 1, the PWM inverter 2 produces pulse-width-modulated signals, and supplies the motor current 1a commensurate with the specified three-phase voltage values to the armature winding of the motor 1 to drive it.

The second speed estimator 22 estimates the rotation speed of the rotor by an estimation method different from the one by which the first speed estimator 20 estimates the rotation speed of the rotor. In other words, the second speed estimator 22 calculates (estimates) the rotation speed of the rotor according to a calculation formula different from the one according to which the first speed estimator 20 calculates (estimates) the rotation speed of the rotor. The rotation speed of the rotor estimated by the second speed estimator 22 is called the second estimated motor speed $\omega_{2e}$.

Formula (3) below is the voltage equation of the motor 1 (the equation of the q-axis voltage $v_q$) as generally known. Here, p represents the differentiation operator. Ignoring the second term (a transient term) in the right side of formula (3) and then substituting $v_\delta$, $i_\delta$, and $i_\gamma$ on the γ-d axes for $v_q$, $i_q$ and $i_d$ on the d-q axes gives formula (4) below, which is the equation of the d-axis voltage $v_d$.

$$v_q = R_a i_q + pL_q i_q + \omega L_d i_d + \omega \Phi_a \quad (3)$$

$$v_\delta = R_a i_\delta + \omega L_d i_\gamma + \omega \Phi_a \quad (4)$$

According to formula (4), the second speed estimator 22 calculates the second estimated motor speed $\omega_{2e}$. In practice, the second speed estimator 22 refers to the relevant values calculated within the motor control device 3, and calculates the second estimated motor speed $\omega_{2e}$ according to formula (5a) below. Normally, the magnetic flux produced by the permanent magnet 1a is significantly higher than the magnetic flux produced by the γ-axis current $i_\gamma$, such that $\Phi_a \gg L_d i_\gamma$. In addition, at an appreciable rotation speed, the voltage drop across the motor resistance is significantly smaller than the d-axis voltage. Hence, the second estimated motor speed $\omega_{2e}$ may be calculated according to formula (5b) below, which is an approximation of formula (5a).

$$\omega_{2e} = \frac{v_\delta^* - R_a i_\delta}{\Phi_a + L_d i_\gamma} \quad (5a)$$

$$\omega_{2e} \approx \frac{v_\delta^*}{\Phi_a} \quad (5b)$$

By referring to the second estimated motor speed $\omega_{2e}$ calculated by the second speed estimator 22 and the specified motor speed value $\omega^*$ (or, as will be described later, the estimated motor speed $\omega_e$), the synchronization failure checker 23 checks whether or not the rotor is in a state of synchronization failure. Here, a state of synchronization failure refers to one in which the rotor becomes unable to rotate according to the specified motor speed value co* (for example, it comes to a standstill). Such a state occurs, for example, when an abrupt variation arises in the load while the rotor is rotating. Also referred to as a state of synchronization failure is one in which the rotor, although an attempt is being made to recover it from a standstill, cannot start rotating again for some reason (a so-called locked state).

If the rotor is not recognized to be in a state of synchronization failure, it is recognized to be operating normally, that is, in a synchronized state. In a synchronized state, the specified motor speed value $\omega^*$ and the estimated motor speed $\omega_e$ are equal (or substantially equal), and in addition the estimated motor speed $\omega_e$ and the second estimated motor speed $\omega_{2e}$ also are equal (or substantially equal).

For example, the synchronization failure checker 23 recognizes the rotor to be in a state of synchronization failure if formula (6) below holds, and recognizes it to be in a synchronized state if formula (6) does not hold. This is to say, with formula (6) rewritten in terms of formulae (5a) and (5b), synchronization failure is recognized if either formula (7a) or (7b) holds.

$$\frac{\omega^*}{\omega_{2e}} > k_1 \quad (6)$$

$$\omega^* > k_1 \frac{v_\delta^* - R_a i_\delta}{\Phi_a + L_d i_\gamma} \quad (7a)$$

$$\omega^* > k_1 \frac{v_\delta^*}{\Phi_a} \quad (7b)$$

Here, $k_1$ has a value greater than 1 (for example, 2) that is determined previously through experiments or otherwise as necessary. Typically, $k_1$ is a constant; however, it may instead be a variable whose value varies according to the relevant value (such as $\omega^*$, $v_d^*$, or $i_d$) within the motor control device 3. When synchronization failure occurs, the rotor usually comes to a standstill. As a result, the specified d-axis voltage value $v_d^*$, which is commensurate with the voltage actually applied to the motor 1, becomes low, and accordingly the second estimated motor speed $\omega_{2e}$ becomes low (see formula (5a) or (5b) above). Hence, according to formula (6) above, that is, according to formula (7a) or (7b), synchronization failure can be detected.

In formulae (5a) and (7a), $i_\gamma$ may be replaced with $i_\gamma^*$. Likewise, in formulae (5a) and (7a), $i_d$ may be replaced with $i_d^*$. This is because, since $i_\gamma$ and $i_d$ are measured current values, they are equal (or substantially equal) to $i_\gamma^*$ and $i_d^*$, which are specified current values. In formulae (6), (7a), and (7b), $\omega^*$ may be replaced with $\omega_e$. This is because $\omega^*$, which is a specified speed value, is equal (or substantially equal) to $\omega_e$. In formula (6), (7a), and (7b), the inequality sign ">" may be replaced with "=".

When formula (6) above is used, synchronization failure is detected based on the ratio of $\omega_{2e}$ to $\omega^*$ (or $\omega_e$). Alternatively, synchronization failure may be detected based on the deviation between $\omega_2$, and $\omega^*$ (or $\omega_e$). Specifically, for example, instead of formula (6), formula (8) below may be used to detect synchronization failure. In that case, the rotor is recognized to be in a state of synchronization failure if formula (8) below holds, and otherwise it is recognized to be in a synchronized state.

$$\omega_{2e} - \omega^* > G_1 \quad (8)$$

In formula (8), $G_1$ is a function of $\omega_{2e}$, $\omega^*$, or $\omega_e$, and this function is, for example, so determined that, when formula (6) holds, formula (8) also holds and in addition that, when formula (6) does not hold, formula (8) also does not hold. In this case, formula (6) is equivalent to formula (8), and hence the detection of synchronization failure using formula (6) is practically the same as the detection of synchronization failure using formula (8). The value of $G_1$ is constantly calculated according to $\omega_{2e}$, $\omega^*$, or $\omega_e$, or is previously determined and is stored as table data in a memory (unillustrated).

Even when the two speed estimators adopt different estimation methods, in a synchronized state, the two methods both calculate speeds close to the real values. In a state of synchronization failure, however, neither of the methods can accurately calculate the real value, and thus the values they calculate are not close to each other. Hence, by comparing the values calculated by the two speed estimators, it is possible to detect synchronization failure with high accuracy.

The first speed estimator 20 is used to control the driving of the motor 1, and the driving of the motor 1 is so controlled that the value ($\omega_e$) estimated by the first speed estimator 20 follows the specified speed value ($\omega^*$). Thus, in case of synchronization failure, the value estimated by the first speed estimator 20 is not correct, and there is a comparatively large deviation between the estimated value and the specified speed value. This deviation is expected to be exploited for the detection of synchronization failure. Inconveniently, however, it occasionally happens that speed control effects (abnormal) energization such that the estimated value becomes equal to the specified speed value, resulting in stable control. This can be avoided by the use of the second speed estimator as in this embodiment, and it is thereby possible to surely detect synchronization failure.

Second Embodiment

Figure 4:
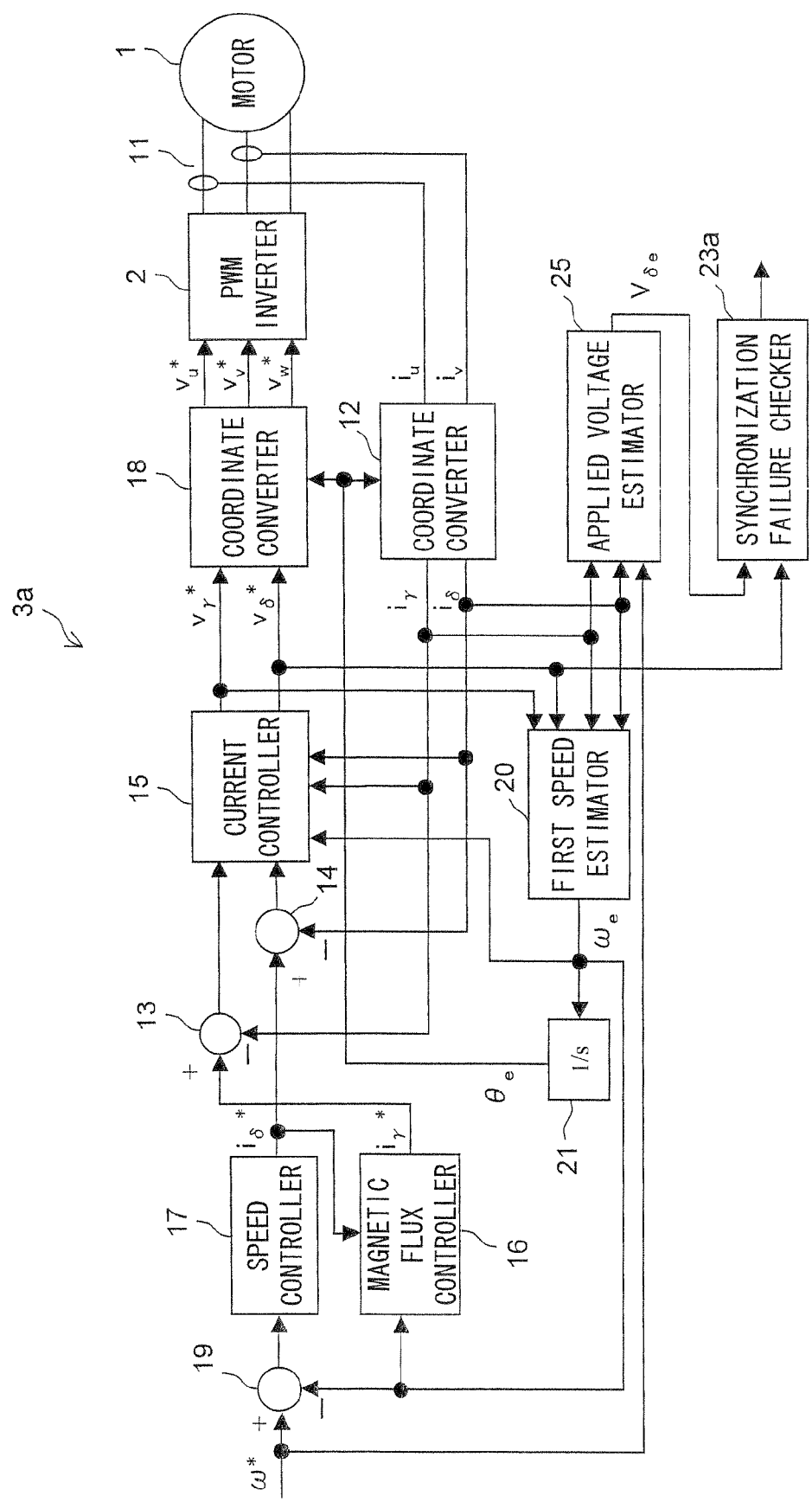
FIG. 4 is a configuration block diagram of a motor drive system as a second embodiment of the present invention.

Next, a second embodiment of the present invention will be described. FIG. 4 is a block configuration diagram of a motor drive system according to the second embodiment. The motor drive system shown in FIG. 4 includes a motor 1, an inverter 2, and a motor control device 3a.

The motor control device 3a includes an applied voltage estimator 25 and a synchronization failure checker 23a instead of the second speed estimator 22 and the synchronization failure checker 23 provided in the motor control device 3 shown in FIG. 3; in other respects, the motor control device 3a and the motor drive system shown in FIG. 4 are the same as the motor control device 3 and the motor drive system shown in FIG. 3. The following description therefore places emphasis on the differences from the first embodiment, and no overlapping description of the common features will be repeated.

The applied voltage estimator 25 estimates (calculates) the d-axis voltage $v_d$ according to formula (4) above. The d-axis voltage $v_d$ estimated by the applied voltage estimator 25 is referred to as the estimated d-axis voltage $v_{de}$. The calculated estimated d-axis voltage $v_{de}$ is fed to the synchronization failure checker 23a.

In practice, the applied voltage estimator 25 refers to the relevant values calculated within the motor control device 3a, and calculates the estimated d-axis voltage $v_{de}$ according to formula (9a) below. Considering that $i_\gamma$ is usually very small, the estimated d-axis voltage $v_{de}$ may be calculated according to formula (9b), which is an approximation of formula (9a). At an appreciable rotation speed, the voltage drop across the motor resistance is significantly smaller than $\omega^*\Phi_a$. Hence, the estimated d-axis voltage $v_{de}$ may be calculated according to formula (9c), which is an approximation of formula (9a).

$$v_{\delta e} = R_a i_\delta + \omega^* L_d i_\gamma + \omega^* \Phi_a \tag{9a}$$

$$v_{\delta e} \approx R_a i_\delta + \omega^* \Phi_a \tag{9b}$$

$$v_{\delta e} \approx \omega^* \Phi_a \tag{9c}$$

By referring to the estimated d-axis voltage $v_{de}$ calculated by the applied voltage estimator 25 and the specified d-axis voltage value $v_d^*$ calculated by the current controller 15, the synchronization failure checker 23a checks whether or not the rotor is in a state of synchronization failure. If the rotor is not recognized in a state of synchronization failure, it is recognized to be in a synchronized state.

For example, the synchronization failure checker 23a recognizes the rotor to be in a state of synchronization failure if formula (10) below holds, and recognizes it to be in a synchronized state if formula (10) does not hold. This is to say, with formula (10) rewritten in terms of formula (9a), (9b) and (9c), synchronization failure is recognized if formula (11a), (11b) or (11c) below holds. Incidentally, in a synchronized state, $v_{de}$ and $v_d^*$ are equal (or substantially equal).

$$\frac{v_\delta^*}{v_{\delta e}} < k_2 \tag{10}$$

$$v_\delta^* < k_2(R_a i_\delta + \omega^* L_d i_\gamma + \omega^* \Phi_a) \tag{11a}$$

$$v_\delta^* < k_2(R_a i_\delta + \omega^* \Phi_a) \tag{11b}$$

$$v_\delta^* < k_2 \omega^* \Phi_a \tag{11c}$$

Here, $k_2$ has a value smaller than 1 (for example, 0.5) that is determined previously through experiments or otherwise as necessary. Typically, $k_2$ is a constant; however, it may instead be a variable whose value varies according to the relevant value (such as $\omega^*$, $v_d^*$, or $i_d$) within the motor control device 3a. When synchronization failure occurs, the rotor usually comes to a standstill. As a result, the specified d-axis voltage value $v_d^*$, which is commensurate with the voltage actually applied to the motor 1, becomes low; on the other hand, the estimated d-axis voltage $v_{de}$, which is calculated on the assumption that the rotor is rotating according to $\omega^*$, has a value commensurate with $\omega^*$. Hence, according to formula (10) above, that is, according to formula (11a), (11b), or (11c), synchronization failure can be detected.

In formula (9a) and (11a), $i_\gamma$ may be replaced with $i_\gamma^*$. Likewise, in formula (9a), (9b), (11a), and (11b), $i_d$ may be replaced with $i_d^*$. In formula (9a), (9b), (9c), (11a), (11b), and (11c), $\omega^*$ may be replaced with $\omega_e$. In formula (10), (11a), (11b), and (11c), the inequality sign "<" may be replaced with "=".

When formula (10) above is used, synchronization failure is detected based on the ratio of $v_{de}$ to $v_d^*$. Alternatively, synchronization failure may be detected based on the deviation between $v_{de}$ and $v_d^*$. Specifically, for example, instead of formula (10), formula (12) below may be used to detect synchronization failure. In that case, the rotor is recognized to be in a state of synchronization failure if formula (12) below holds, and otherwise it is recognized to be in a synchronized state.

$$v_{\delta e} - v_\delta^* > G_2 \tag{12}$$

In formula (12), $G_2$ is a function of $v_{de}$ or $v_d^*$, and this function is, for example, so determined that, when formula (10) holds, formula (12) also holds and in addition that, when formula (10) does not hold, formula (12) also does not hold. In this case, formula (10) is equivalent to formula (12), and hence the detection of synchronization failure using formula (10) is practically the same as the detection of synchronization failure using formula (12). The value of $G_2$ is constantly calculated according to $v_{de}$ or $v_d^*$, or is previously determined and is stored as table data in a memory (unillustrated).

In the first embodiment, the speed is estimated from the specified voltage value; conversely, in this embodiment, the applied voltage is estimated from the specified speed value or the estimated speed, and synchronization failure is detected based on a comparison between the estimated applied voltage and the specified voltage value.

Third Embodiment

Figure 5:
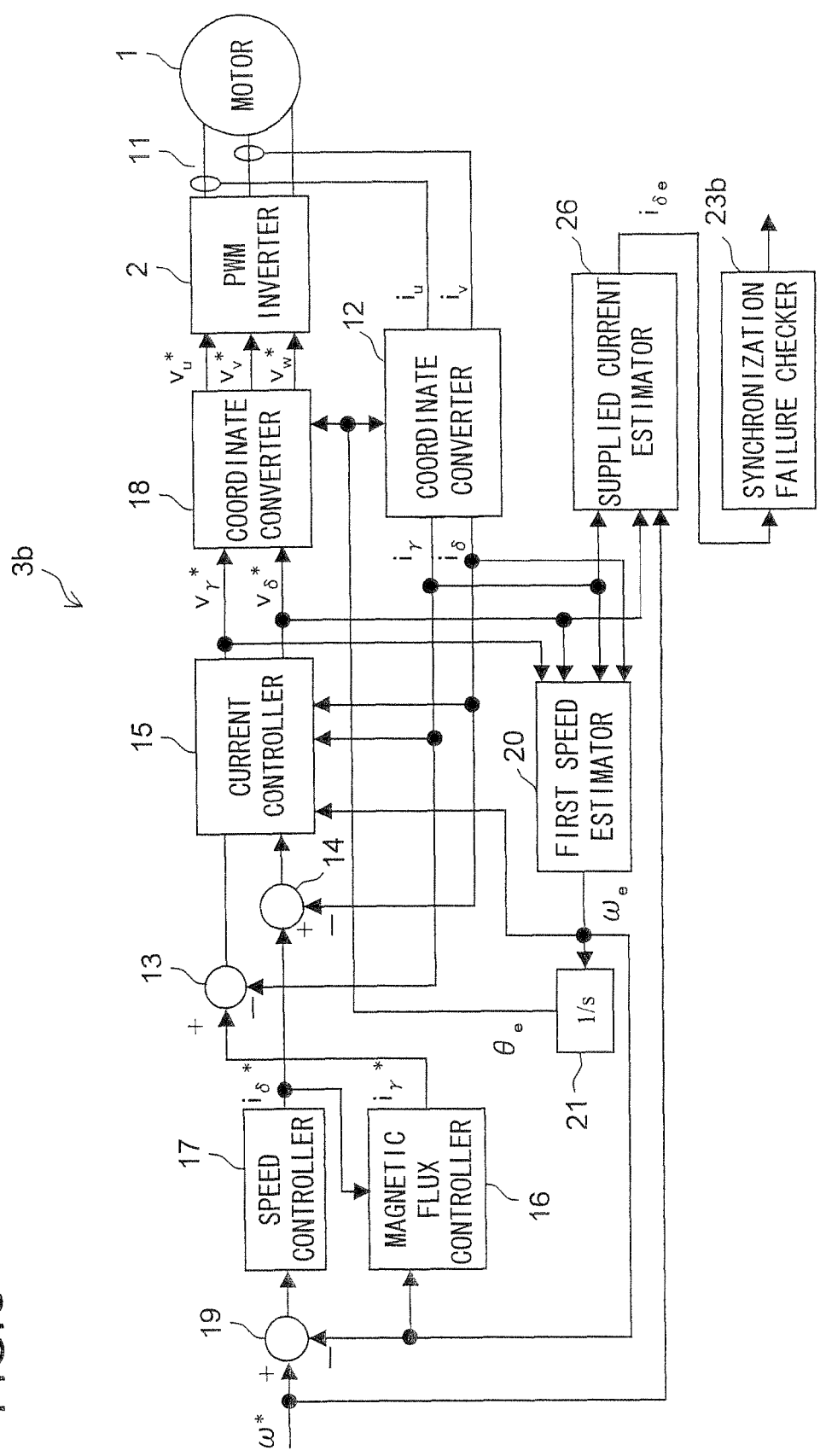
FIG. 5 is a configuration block diagram of a motor drive system as a third embodiment of the present invention.

Next, a third embodiment of the present invention will be described. FIG. 5 is a block configuration diagram of a motor drive system according to the third embodiment. The motor drive system shown in FIG. 5 includes a motor 1, an inverter 2, and a motor control device 3b.

The motor control device 3b includes a supplied current estimator 26 and a synchronization failure checker 23b instead of the second speed estimator 22 and the synchronization failure checker 23 provided in the motor control device 3 shown in FIG. 3; in other respects, the motor control device 3b and the motor drive system shown in FIG. 5 are the same as the motor control device 3 and the motor drive system shown in FIG. 3. The following description therefore places emphasis on the differences from the first embodiment, and no overlapping description of the common features will be repeated.

The supplied current estimator 26 estimates (calculates) the d-axis current $i_d$ according to formula (4) above. The d-axis current $i_d$ estimated by the supplied current estimator 26 is referred to as the estimated d-axis current $i_{de}$. The calculated estimated d-axis current $i_{de}$, is fed to the synchronization failure checker 23b.

In practice, the supplied current estimator 26 refers to the relevant values calculated within the motor control device 3b, and calculates the estimated d-axis current $i_{de}$ according to formula (13a) below. Considering that $i_\gamma$ is usually very small, the estimated d-axis current $i_{de}$ may be calculated according to formula (13b) below, which is an approximation of formula (13a).

$$i_{\delta e} = \frac{1}{R_a}(v_\delta^* - (\omega^* L_d i_\gamma + \omega^* \Phi_a)) \quad (13a)$$

$$i_{\delta e} \approx \frac{1}{R_a}(v_\delta^* - \omega^* \Phi_a) \quad (13b)$$

By referring to the estimated d-axis current $i_{de}$ calculated by the supplied current estimator 26 and the specified d-axis current value $i_d^*$ calculated by the speed controller 17 (or the d-axis current $i_d$ calculated by the coordinate converter 12), the synchronization failure checker 23b checks whether or not the rotor is in a state of synchronization failure. Here, the reference to $i_d^*$ (or $i_d$) may be omitted. If the rotor is not recognized in a state of synchronization failure, it is recognized to be in a synchronized state.

For example, the synchronization failure checker 23b recognizes the rotor to be in a state of synchronization failure if formula (14), (15), or (16) below holds, and recognizes it to be in a synchronized state if none of those formula holds. The value of $i_{de}$ in formula (14), (15), and (16) is calculated according to formula (13a) or (13b) above. Incidentally, in a synchronized state, $i_{de}$ and $i_d^*$ are equal (or substantially equal).

$$\frac{i_{\delta e}}{i_\delta^*} < k_3 \quad (14)$$

$$i_{\delta e} - i_\delta^* < k_4 \quad (15)$$

$$i_{\delta e} < k_5 \quad (16)$$

Here, $k_3$, $k_4$, and $k_5$ have values that are determined previously through experiments or otherwise as necessary. Typically, $k_3$, $k_4$, and $k_5$ are constants; however, any of them may instead be a variable whose value varies according to the relevant value (such as $\omega$, $v_d^*$, or $i_d$) within the motor control device 3b. When synchronization failure occurs, the rotor usually comes to a standstill. As a result, the specified d-axis voltage value $v_d^*$, which is commensurate with the voltage actually applied to the motor 1, becomes low, specifically smaller than $\omega^*\Phi_a$. That is, in case of synchronization failure, $i_{de}$ has a negative value. When the motor 1 is driven, $i_d^*>0$ always holds.

Accordingly, $k_3$ is given a value smaller than 1, for example, 0, 0.5, or a negative value close to 0; $k_4$ is given a negative value; and $k_5$ is set equal 0 or is given a negative value.

In formula (13a), $i_\gamma$ may be replace with $i_\gamma^*$. Likewise, in formulae (14) and (15), $i_d^*$ may be replaced with $i_d$. In formulae (13a) and (13b), $\omega^*$ may be replaced with $\omega_e$. In formula (14), (15), and (16), the inequality sign "<" may be replaced with "=".

Fourth Embodiment

Figure 6:
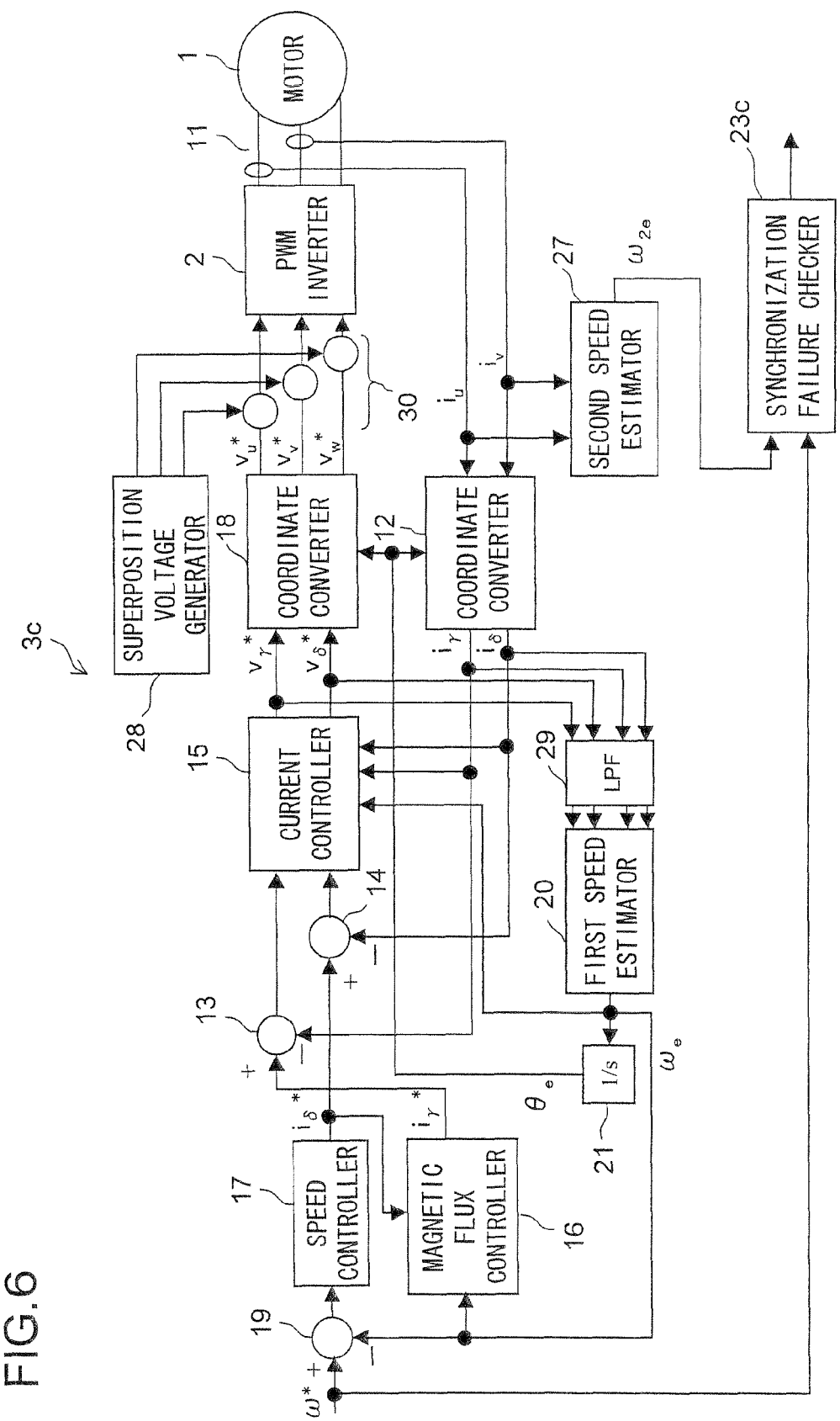
FIG. 6 is a configuration block diagram of a motor drive system as a fourth embodiment of the present invention.

Next, a fourth embodiment of the present invention will be described. FIG. 6 is a block configuration diagram of a motor drive system according to the fourth embodiment. The motor drive system shown in FIG. 6 includes a motor 1, an inverter 2, and a motor control device 3c.

As compared with the motor control device 3 shown in FIG. 3, the motor control device 3c additionally includes a superposition voltage generator 28, a LPF (low-pass filter) 29, and adder 30, and includes, instead of the second speed estimator 22 and the synchronization failure checker 23 provided in the motor control device 3 shown in FIG. 3, a second speed estimator 27 and a synchronization failure checker 23c. In other respects, the motor control device 3c and the motor drive system shown in FIG. 6 are the same as the motor control device 3 and the motor drive system shown in FIG. 3. The following description therefore places emphasis on the differences from the first embodiment, and no overlapping description of the common features will be repeated.

The superposition voltage generator 28 generates and outputs superposition voltages to be superposed on the specified U-phase, V-phase, and W-phase voltage values $v_u^*$, $v_v^*$, and $v_w^*$. These superposition voltages consist of a U-phase superposition voltage $vh_u$ for $v_u^*$ (the U-phase component of the superposition voltages), a V-phase superposition voltage $vh_v$ for $v_v^*$ (the V-phase component of the superposition voltages), and a W-phase superposition voltage $vh_w$ for $v_w^*$ (the W-phase component of the superposition voltages). The adder 30 adds $vh_u$, $vh_v$ and $vh_w$ respectively to $v_u^*$, $v_v^*$ and $v_w^*$ from the coordinate converter 18, and outputs the results of the addition to PWM inverter 2.

Thus, in this embodiment, specified three-phase voltage values consisting of $(v_u^*+vh_u)$, $(v_v^*+vh_v)$, and $(v_w^*+vh_w)$ are, as the voltages to be applied to the motor 1, fed to the PWM inverter 2. The PWM inverter 2 drives the motor 1 by supplying the armature winding of the motor 1 with the motor current Ia commensurate with the specified three-phase voltage values having the superposition voltages superposed thereon.

As described above, in this embodiment, superposition voltages are superposed on the drive voltages, represented by $v_u^*$, $v_v^*$ and $v_w^*$, for driving the motor 1. As a result of the superposition of these superposition voltages, superposition currents commensurate with the superposition voltages are superposed on the drive currents, referred to as the specified γ-axis and d-axis current values $i_\gamma^*$ and $i_d^*$, for driving the motor 1.

The superposition voltages generated by the superposition voltage generator 28 form a high-frequency rotating voltage. Here, "high-frequency" means that the frequency of the superposition voltages is significantly higher than the frequency of the drive voltages. Accordingly, the frequency of the superposition currents, which is superposed according to those superposition voltages, is significantly higher than the frequency of the drive currents. On the other hand, "rotating voltage" means that the voltage vector locus of the superposition voltages is circular on fixed coordinate axes.

Figure 7:
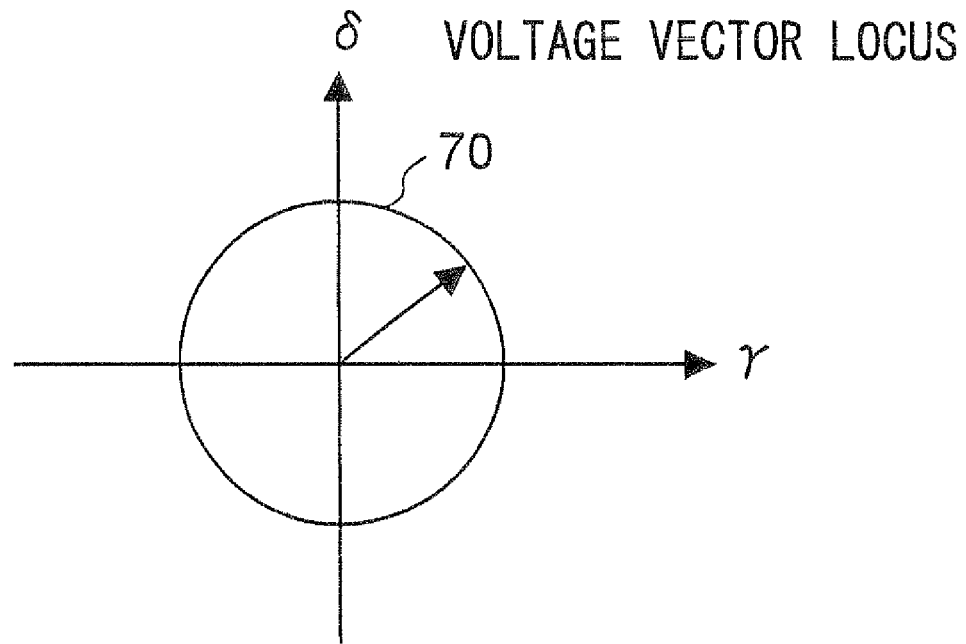
FIG. 7 is a diagram showing an example of the voltage vector locus of the superposition voltage outputted from the superposition voltage generator shown in FIG. 6.

Even when considered on the γ-d axes (the γ-d plane), the voltage vector locus of the superposition voltages generated by the superposition voltage generator 28 is circular, for example like the voltage vector locus 70 shown in FIG. 7. When the superposition voltages are three-phase balanced voltages, their voltage vector locus is, like the voltage vector locus 70, perfectly circular, lying on the γ-d axes and centered at the origin. This rotating voltage (forming the superposition voltages) is a high-frequency voltage that is not synchronous with the motor 1, and thus its application to the motor 1 does not cause it to rotate.

Figure 8:
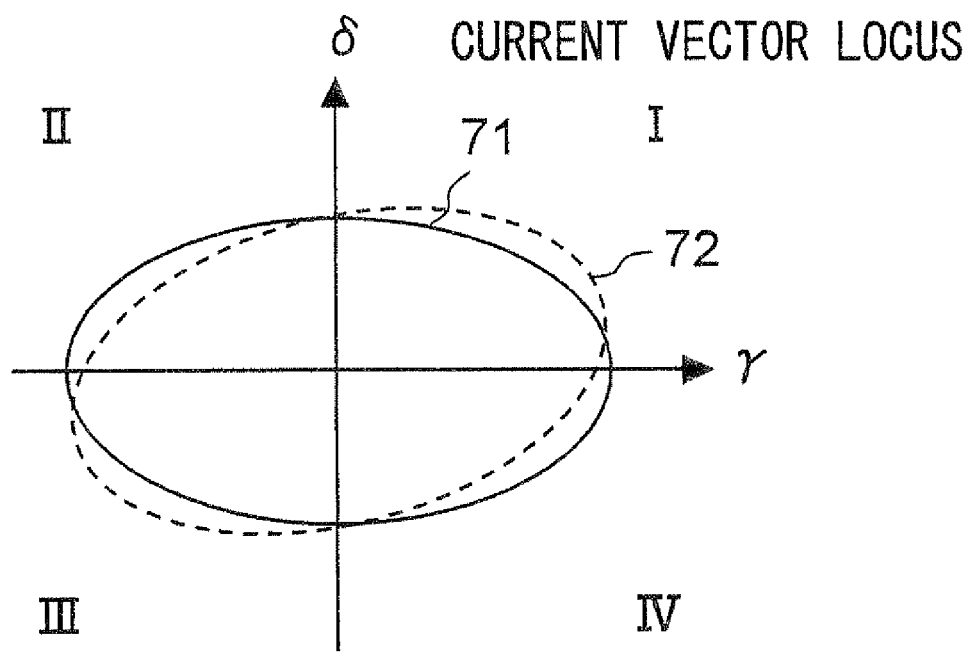
FIG. 8 is a diagram showing the current vector locus of the superposition current that flows according to the superposition voltage shown in FIG. 7.

When the motor 1 is an interior permanent magnet synchronous motor or the like and $L_d < L_q$ holds, the current vector locus of the superposition currents that are caused to flow through the motor 1 by the superposition voltages having the voltage vector locus 70 is elliptic, like the current vector locus 71 shown in FIG. 8, lying on the γ-d axes (the γ-d plane), centered at the origin, having a major axis aligned with the γ-axis, and having a minor axis aligned with the d-axis. Here, the current vector locus 71 is one observed when the axis error Δθ equals zero. When the axis error Δθ is non-zero, the current vector locus of the superposition currents is elliptic, like the current vector locus 72, having a major (or minor) axis departed from the γ-axis (or the d-axis). That is, when the axis error Δθ is non-zero, the current vector locus 71 rotates about the origin on the γ-d axes (the γ-d plane) and is inclined like the current vector locus 72.

The γ-axis and d-axis components of the superposition currents are referred to as the γ-axis superposition current $ih_\gamma$ and the d-axis superposition current $ih_d$. Their arithmetic product ($ih_\gamma \times ih_d$) contains a direct-current component that depends on the inclination of the elliptic current vector locus 72. The arithmetic product ($ih_\gamma \times ih_d$) is positive in the first and third quadrant of the current vector locus, and is negative in the second and fourth quadrant thereof; it thus includes no direct-current component when the ellipse is not inclined (like the current vector locus 71) and comes to include a direct-current component as the ellipse is inclined (like the current vector locus 72). In FIG. 8, I, II, III, and IV represent the first, second, third, and fourth quadrant on the γ-d axes (the γ-d plane).

Figure 9:
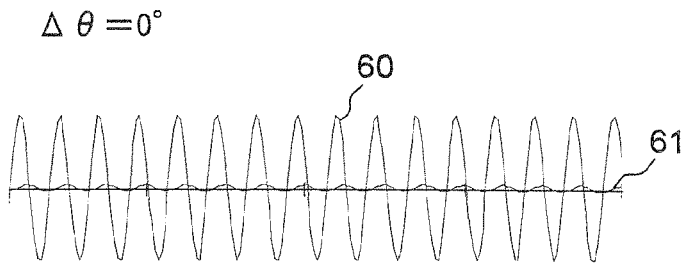
FIG. 9 is a waveform diagram showing the arithmetic product of the γ-axis and d-axis components of the superposition current along with the direct-current component of the arithmetic product (assuming that the axis error is zero)
Figure 10:
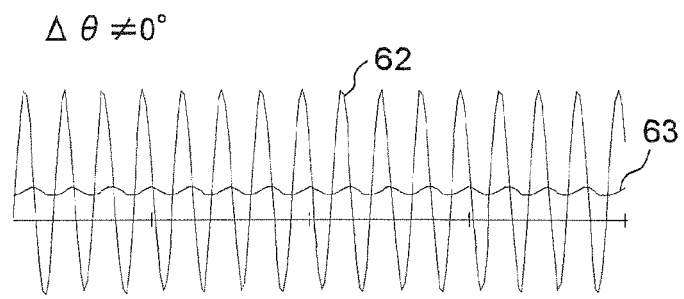
FIG. 10 is a waveform diagram showing the arithmetic product of the γ-axis and d-axis components of the superposition current along with the direct-current component of the arithmetic product (assuming that the axis error is non-zero)

In FIG. 9, with the horizontal axis representing time, curves 60 and 61 respectively represent the arithmetic product ($ih_\gamma \times ih_d$) and its direct-current component as observed when the axis error Δθ equals zero. In FIG. 10, with the horizontal axis representing time, curves 62 and 63 respectively represent the arithmetic product ($ih_\gamma \times ih_d$) and its direct-current component as observed when the axis error Δθ is non-zero. As will be understood from FIGS. 9 and 10, the direct-current component of the arithmetic product ($ih_\gamma \times ih_d$) equals zero when Δθ=0°, and is non-zero when Δθ≠0°. Moreover, the direct-current component increases as the axis error Δθ increase (the former is substantially proportional to the latter). If control is performed such that the direct-current component converges to zero, then the axis error Δθ converges to zero.

Figure 11:
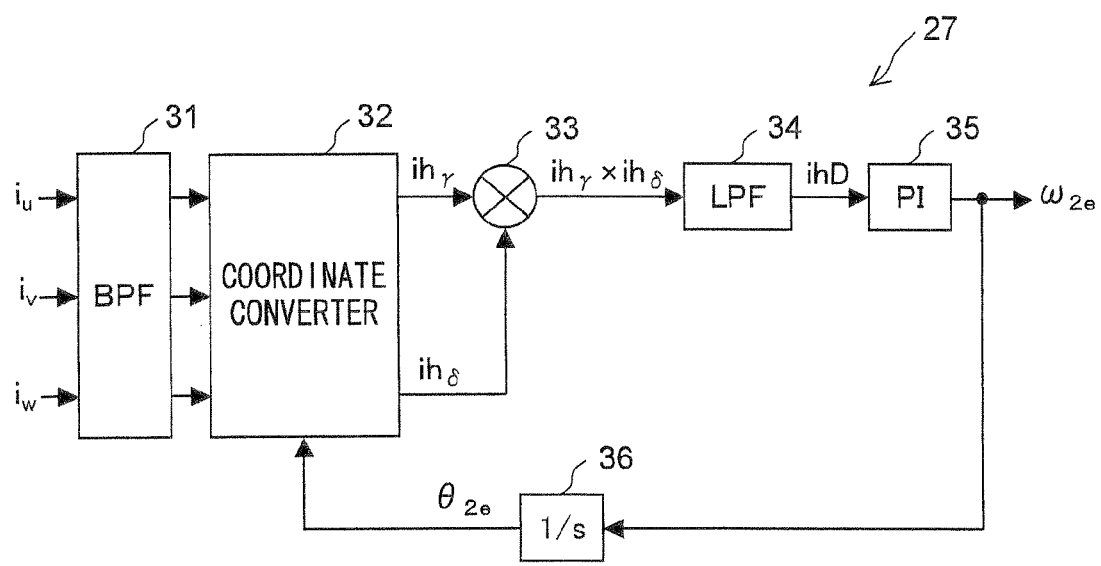
FIG. 11 is an internal block diagram of the second speed estimator shown in FIG. 6.

This relationship is exploited by the second speed estimator 27, which thus estimates the second estimated motor speed $\omega_{2e}$ such that the direct-current component of the arithmetic product ($ih_\gamma \times ih_d$) converges to zero. This estimation method, as in the first embodiment, differs from the one adopted in the first speed estimator 20. FIG. 11 is a block diagram showing an example of the internal configuration of the second speed estimator 27. The second speed estimator 27 shown in FIG. 11 includes a BPF (band-pass filter) 31, a coordinate converter 32, a multiplier 33, a LPF (low-pass filter) 34, a proportional-plus-integral calculator 35, and an integrator 36.

Suppose now that the frequency (electrical angular velocity) of the superposition voltages on fixed coordinate axes is $\omega_h$. In the second speed estimator 27, the BPF 31 is fed with the U-phase and V-phase currents $i_u$ and $i_v$ detected by the current detector 11. The BPF 31 is also fed with the W-phase current $i_w$ (the current flowing through the W-phase part of the armature winding) detected by the current detector 11, or the W-phase current $i_w$ calculated from the U-phase and V-phase currents $i_u$ and $i_v$.

The BPF 31 extracts the $\omega_h$ frequency components from $i_u$, $i_v$, and $i_w$, and outputs them. The BPF 31 is a band-pass filter that receives, as the input signals thereto, $i_u$, $i_v$, and $i_w$ and whose pass band includes the frequency $\omega_h$; typically, for example, the center frequency of its pass band is set at $\omega_h$. The BPF 31 eliminates the components of the frequency of the drive currents.

Based on the second estimated rotor position $\theta_{2e}$ fed from the integrator 36, the coordinate converter 32 converts the $\omega_h$ frequency components of $i_u$, $i_v$, and $i_w$ into two-phase currents on the γ-d axes, namely the γ-axis superposition current $ih_\gamma$ and the d-axis superposition current $ih_d$. The γ-axis and d-axis superposition currents $ih_\gamma$ and $ih_d$ respectively represent the γ-axis and d-axis components of the superposition currents superposed according to the superposition voltages. Incidentally, the second estimated rotor position $\theta_{2e}$ is calculated based on the second estimated motor speed $\omega_{2e}$ as will be described later and is, in strict terms, different from $\theta_e$; in a synchronized state, however, it is regarded as equal to $\theta_e$.

The multiplier 33 calculates the arithmetic product ($ih_\gamma \times ih_d$) of the γ-axis and d-axis superposition currents $ih_\gamma$ and $ih_d$. The LPF 34 eliminates high-frequency components from the arithmetic product ($ih_\gamma \times ih_d$) and thereby extracts the direct-current component ihD of the arithmetic product ($ih_\gamma \times ih_d$).

To achieve PLL (phase locked loop) control, the proportional-plus-integral calculator 35, cooperating with the integrator 36 among others, performs proportional-plus-integral control to calculate the second estimated motor speed $\omega_{2e}$ such that the direct-current component ihD outputted from the LPF 34 converges to zero. The integrator 36 integrates the second estimated motor speed $\omega_{2e}$ outputted from the proportional-plus-integral calculator 35 to calculate the second estimated rotor position $\theta_{2e}$.

In a synchronized state, the second estimated motor speed $\omega_{2e}$ calculated as described above is equal (or substantially equal) to the estimated motor speed $\omega_e$ and the specified motor speed value $\omega^*$.

The LPF 29 shown in FIG. 6 eliminates the high-frequency components attributable to the superposition voltages from $v_\gamma^*$ and $v_d^*$ from current controller 15 and from $i_\gamma$ and $i_d$ from the coordinate converter 12. Based on $v_\gamma^*$, $v_d^*$, $i_\gamma$, and $i_d$ thus having the high-frequency components attributable to the superposition voltages eliminated by the LPF 29, the first speed estimator 20 calculates the estimated motor speed $\omega_e$.

The second estimated motor speed $\omega_{2e}$ calculated by the proportional-plus-integral calculator 35 is fed to the synchronization failure checker 23c shown in FIG. 6. The synchronization failure checker 23c is the same as the synchronization failure checker 23 shown in FIG. 3, and detects synchronization failure by the same method as the synchronization failure checker 23 shown in FIG. 3.

In the second speed estimator 27 shown FIG. 11, the coordinate converter 32 performs coordinate conversion after the BPF 31 has extracted the superposition current components; alternatively, the superposition current components may be extracted after coordinate conversion has been performed. In that case, a BPF for extracting the $(\omega_h-\omega_{2e})$ frequency components is provided in the stage succeeding the coordinate converter. For example, the center frequency of the pass band of this BPF is set at $(\omega_h-\omega_{2e})$.

In FIG. 6, the superposition voltages generated by the superposition voltage generator 28 is added to the specified voltage value after the coordinate conversion by the coordinate converter 18; alternatively, the addition of the superposition voltages may be performed before the coordinate conversion. In that case, the added superposition voltages are given, for example, a voltage vector that rotates at a frequency of $(\omega_h-\omega_{2e})$ on the γ-d axes.

The voltage vector locus of the superposition voltages generated by the superposition voltage generator 28 does not necessarily have to be a perfect circle on the γ-d axes. So long as the voltage vector locus of the superposition voltages on the γ-d axes (the γ-d plane) has a shape that includes the origin and that is symmetric about the γ-axis or d-axis, the superposition voltages may be any voltages.

Here, "includes the origin" means that the origin on the γ-d axes is located inside the "symmetric shape" mentioned above; "symmetric about the γ-axis" means that, of the voltage vector locus on the γ-d axes, the part located in the first and second quadrants and the part located in the third and fourth quadrants are so shaped as to be line-symmetric about the γ-axis; "symmetric about the d-axis" means that, of the voltage vector locus on the γ-d axes, the part located in the first and fourth quadrants and the part located in the second and third quadrants are so shaped as to be line-symmetric about the d-axis.

For example, the voltage vector locus of the superposition voltages on the γ-d axes may be elliptic, having a minor or major direction aligned with the γ-axis; it may be linear, aligned with the γ-axis or d-axis (i.e., a single-phase alternating voltage may instead be used); or it may be rectangular centered at the origin.

Instead of injecting superposition currents by superposing high-frequency superposition voltages, it is also possible to provide a superposition current generator (unillustrated) so that high-frequency superposition currents are superposed directly on $i_\gamma^*$ and $i_d^*$. The frequency of these superposition currents is significantly higher than that of the drive currents represented by $i_\gamma^*$ and $i_d^*$. In that case, a γ-axis superposition current $ih_\gamma$ and a d-axis superposition current $ih_d$ are respectively superposed on the specified γ-axis current value $i_\gamma^*$ outputted from the magnetic flux controller 16 and on the specified d-axis current value $i_d^*$ outputted from the speed controller 17.

Moreover, in this case, from $v_\gamma$ and $v_d^*$ calculated by the current controller 15, those components $vh_\gamma$ and $vh_d$ in the superposition voltages which are attributable to the superposition currents are extracted with a BPF. In addition, the direct-current component vhD of the arithmetic product $(vh_\gamma \times vh_d)$ is extracted, and proportional-plus-integral control is performed to calculate the second estimated motor speed $\omega_{2e}$ such that the direct-current component vhD converges to zero.

The current vector locus of the superposition currents generated by the superposition current has, on the γ-d axes, a shape that includes the origin and that is symmetric about the γ-axis or d-axis. For example, the current vector locus on the γ-d axes may be perfectly circular, centered at the origin; it may be elliptic, having a minor or major axis aligned with the γ-axis; it may be linear, aligned with the γ-axis or d-axis; or it may be rectangular, centered at the origin.

In case of synchronization failure, the first speed estimator 20 used to control the driving of the motor 1 cannot calculate the correct speed. By contrast, exploiting the magnetic salient poles of the rotor, the method involving the injection of high-frequency superposition currents can detect the rotor position accurately even when the rotation speed of the rotor is low, and can detect a rotation standstill surely even in case of one resulting from synchronization failure.

Thus, by comparing the second estimated motor speed $\omega_{2e}$ with the specified motor speed value $\omega^*$, or with the estimated motor speed $\omega_e$ (described in detail later) estimated from the axis error or the like based on the induction voltages (in other words, electromotive forces), it is possible to surely detect synchronization failure.

There have conventionally been proposed various methods for estimating the rotation speed and rotor position of a rotor, and different methods have different advantages and disadvantages; for example, some methods are suitable for low speeds, while other methods are suitable for high speeds, etc. Out of this consideration, estimation methods may be switched between at comparatively low speeds and at comparatively high speeds. In that case, typically, as the rotation speed becomes high, estimation by a method suitable for low speeds is stopped, and instead estimation by a method suitable for high speeds is started. By contrast, in this embodiment (and the first embodiment), the first speed estimator for controlling the driving of the motor 1 and the second speed estimator that is not directly concerned with the driving of the motor 1 are operated concurrently, irrespective of the rotation speed, to detect synchronization failure, thereby achieving a unique detection method.

First speed estimator: Next, a detailed description will be given of the first speed estimator 20 used in the embodiments described above. The first speed estimator 20 calculates the estimated motor speed $\omega_e$ based on all or part of the specified γ-axis voltage value $v_\gamma^*$ and specified d-axis voltage value $v_d^*$ calculated by the current controller 15 and the γ-axis current $i_\gamma$ and d-axis current $i_d$ calculated by the coordinate converter 12, with the exception that, in the fourth embodiment (FIG. 6), the first speed estimator 20 calculates $\omega_e$ based on all or part of $v_\gamma^*$, $v_d^*$, $i_\gamma$, and $i_d$ having the high-frequency components eliminated therefrom as fed via the LPF 29.

Various methods for estimating the rotation speed of the rotor can be adopted in the first speed estimator 20.

One example is to use formula (17) below, which is disclosed in Japanese Patent No. 3411878. Specifically, with reference to the self-estimated $\omega_e$, the axis error $\Delta\theta$ is calculated according to formula (17) below; then, the axis error $\Delta\theta$ is made to converge to zero by proportional-plus-integral control, and thereby $\omega_e$ is estimated. It should be noted here that, whereas according to Japanese Patent No. 3411878, the difference between the γ-axis and the d-axis is represented by $\Delta\theta$, in this embodiment the difference d-axis and the γ-axis is represented by $\Delta\theta$, with the result that opposite signs appear between in the formula for calculating $\Delta\theta$ in Japanese Patent No. 3411878 and in formula (17).

$$\Delta\theta = \tan^{-1}\left(\frac{-(v_y^* - R_a i_\gamma + \omega_e L_q i_\delta)}{v_\delta^* - R_a i_\delta - \omega_e L_q i_\gamma}\right) \quad (17)$$

Another example is, as disclosed in JP-A-2006-067656, to estimate the d-axis magnetic flux, which is the component of the magnetic flux parallel to the d-axis of the permanent magnet, based on the motor current and then make the d-axis magnetic flux converge to zero to thereby estimate $\omega_e$.

As yet another example, the method (hereinafter referred to as the dmqm method) proposed by the applicant will be described below. The dmqm method is discussed in detail in, among others, Japanese Patent Application No. 2006-043398.

First, for easy understanding of the significance of the dmqm method, a brief description will be given of a common method for achieving maximum torque control.

A common motor control device controls a motor so that the axis error $\Delta\theta$ converges to zero. On the other hand, a formula for calculating the d-axis current $i_d$ for the purpose of maximum torque control exploiting a reluctance torque is widely known, and generally, to achieve maximum torque control, the specified γ-axis current value $i_\gamma^*$ is calculated according to formula (18) below.

$$i_\gamma^* = \frac{\Phi_a}{2(L_q - L_d)} - \sqrt{\frac{\Phi_a^2}{4(L_q - L_d)^2} + i_\delta^{*2}} \quad (18)$$

Achieving maximum torque control based on formula (18) above presupposes that the axis error $\Delta\theta$ is kept equal to zero, and, to calculate the axis error $\Delta\theta$, it is necessary to previously calculate parameters needed in calculation, such as the q-axis inductance $L_q$. Thus, to achieve maximum torque control, first, the relevant parameters need to be so adjusted that the axis error $\Delta\theta$ is kept equal to zero; in addition, second, the parameters used in formula (18) need to be adjusted; furthermore, third, the specified γ-axis current value $i_\gamma^*$ needs to be calculated constantly according to formula (18).

The dmqm method applicable to any of the embodiments contributes to simplifying the adjustment of calculation parameters and reducing the amount of calculation. Now, the dmqm method will be described.

Figure 12:
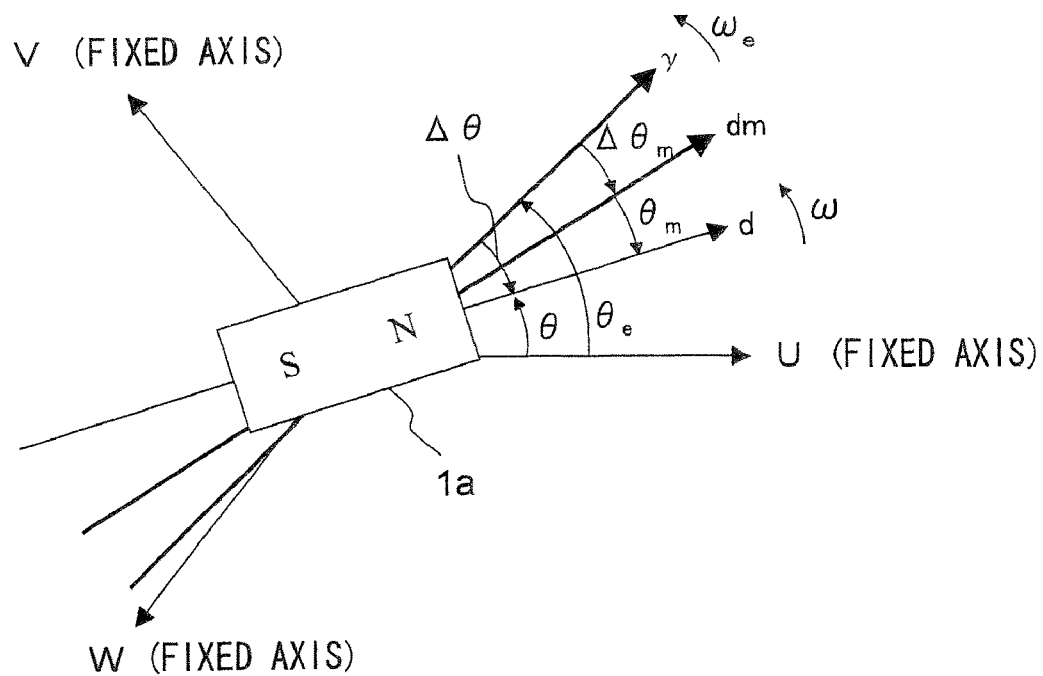
FIG. 12 is an analysis model diagram of the motor, illustrating a dmqm method applicable in any embodiment of the present invention.
Figure 13:
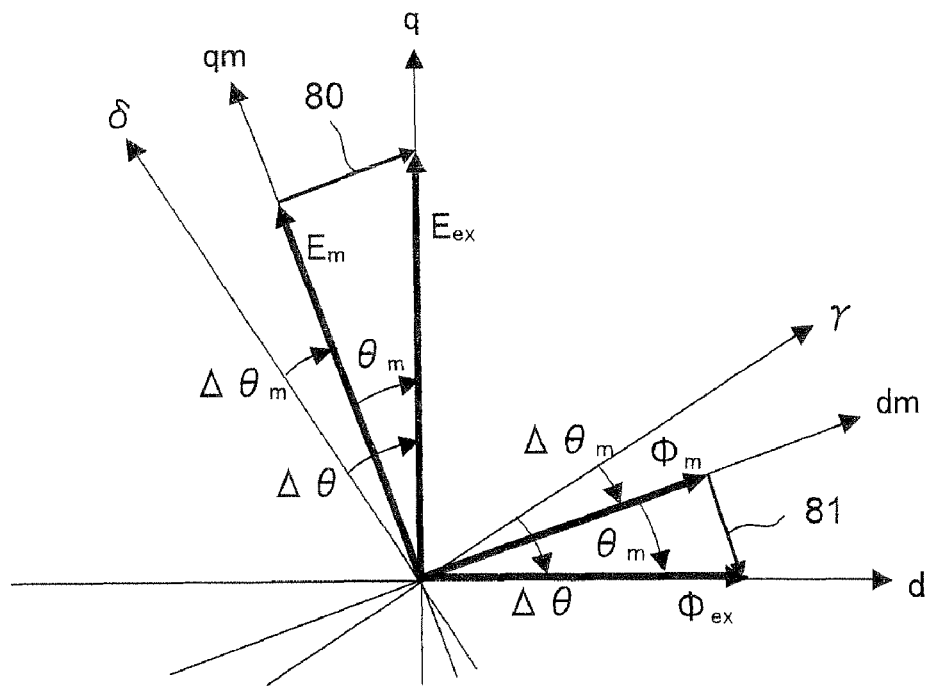
FIG. 13 is an analysis model diagram of the motor, illustrating a dmqm method applicable in any embodiment of the present invention.

FIGS. 12 and 13 are analysis model diagrams of the motor 1, illustrating the operation of the first speed estimator 20. FIG. 12 is a more detailed version of the analysis model diagram of FIG. 2.

The rotation axis whose direction coincides with that of the current vector to be fed to the motor 1 when maximum torque control is achieved is called the qm-axis. The axis that lags behind the qm-axis by an electrical angle of 90 degrees is called the dm-axis. The coordinate axes consisting of the dm and qm-axes is called the dm-qm axes.

As is well-known, the motor current that achieves maximum torque control has a positive q-axis component and a negative d-axis component. Thus, the qm-axis leads the q-axis in phase. The lead in phase occurs counter-clockwise in FIGS. 12 and 13.

The phase (angle) of the q-axis relative to the qm-axis is represented by $\theta_m$, and the phase (angle) of the qm-axis relative to the d-axis is represented by $\Delta\theta_m$. Then, needless to say, the phase of the d-axis relative to the dm-axis also equals $\theta_m$, and the phase of the dm-axis relative to the γ-axis also equals $\Delta\theta_m$. What $\theta_m$ represents is the lead angle of the qm-axis (dm-axis) relative to the q-axis (d-axis). What $\Delta\theta_m$ represents is the axis error between the qm-axis and the d-axis (the axis error between the dm-qm axes and the γ-d axes). The value of $\Delta\theta$, which is the axis error between the d- and γ-axes, is given by $\Delta\theta = \Delta\theta_m + \theta_m$.

As described above, here, it is assumed that the dm-axis leads the d-axis in phase and that $\theta_m$ is then negative. Likewise, when the γ-axis leads the dm-axis in phase, $\Delta\theta_m$ is negative. The vectors (such as $E_m$) shown in FIG. 13 will be described later.

The dm-axis and qm-axis components of the motor current Ia are referred to as the dm-axis current $i_{dm}$ and the qm-axis current $i_{qm}$ respectively. The dm-axis and qm-axis components of the motor voltage Va are referred to as the dm-axis voltage $v_{dm}$ and the qm-axis voltage $v_{qm}$ respectively.

According to the dmqm method, the axis error $\Delta\theta_m$ between the qm-axis (dm-axis) and the d-axis (γ-axis) is estimated, and thereby the γ-axis, which is an estimated axis, is made to converge to dm-axis (i.e., the axis error $\Delta\theta_m$ is made to converge to zero). Then, the motor current Ia is broken down into the qm-axis current $i_{qm}$ parallel to the qm-axis and the dm-axis current $i_{dm}$ parallel to the dm-axis, and thereby the motor 1 is vector-controlled.

Even in this case, as with the common method for achieving maximum torque control previously described with reference to formula (18), the parameters for estimating the axis error $\Delta\theta_m$ (for making the axis error $\Delta\theta_m$ converge to zero) need to be adjusted. Here, however, completing those adjustments simultaneously brings about the completion of the adjustment of the parameters for achieving maximum torque control. That is, since the adjustment of the parameters for estimating the axis error is shared as the adjustment of the parameters for achieving maximum torque control, quite advantageously, the necessary adjustments can be made very easily.

Figure 14:
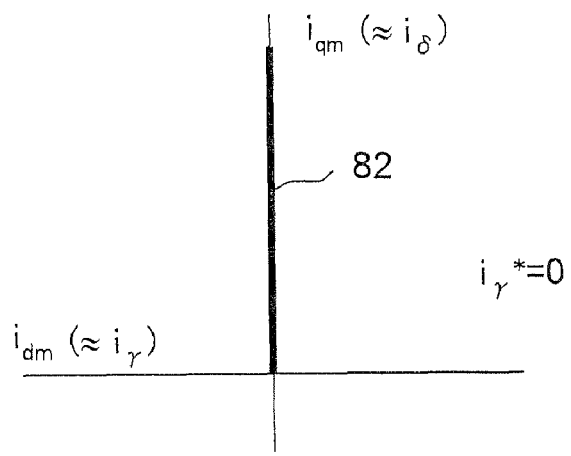
FIG. 14 is a diagram showing the current locus of the motor current, as observed when a dmqm method is adopted.

Moreover, as will be clear from the definition of the qm-axis, the current locus of the motor current Ia as observed in maximum torque control lies on the qm-axis, as indicated by a solid line 82 in FIG. 14. Thus, in maximum torque control, it is not necessary to calculate the specified γ-axis current value $i_\gamma^*$ according to a complicated formula like formula (18) above; this helps alleviate the burden of calculation. Here, the specified γ-axis current value $i_\gamma$ equals zero or a predetermined value close to zero, irrespective of the value of $i_d$.

Now, the dmqm method will be described in more detail with reference to voltage equations. The extension induction voltage (extended electromotive force) equation on the real axes are given by formula (26), and the extension induction voltage (extended electromotive force) $E_{ex}$ is given by formula (27). In the formulae below, p represents the differentiation operator. It should be noted that, for consistency with the formula numbers used in the specification of Japanese Patent Application No. 2006-043398, in the present specification, formula numbers (19) to (25) are vacant.

$$\begin{bmatrix} v_d \\ v_q \end{bmatrix} = \begin{bmatrix} R_a + pL_d & -\omega L_q \\ \omega L_q & R_a + pL_d \end{bmatrix} \begin{bmatrix} i_d \\ i_q \end{bmatrix} + \begin{bmatrix} 0 \\ E_{ex} \end{bmatrix} \quad (26)$$

$$E_{ex} = \omega((L_d - L_q)i_d + \Phi_a) - (L_d - L_q)(pi_q) \quad (27)$$

Performing coordinate conversion so that formula (26) on the real axes is converted into one on the γ-d axes estimated for control purposes gives formula (28). Ignoring the third term in the right side of formula (28) for the sake of simplicity gives formula (29).

$$\begin{bmatrix} v_\gamma \\ v_\delta \end{bmatrix} = \begin{bmatrix} R_a + pL_d & -\omega L_q \\ \omega L_q & R_a + pL_d \end{bmatrix} \begin{bmatrix} i_\gamma \\ i_\delta \end{bmatrix} + E_{ex} \begin{bmatrix} -\sin\Delta\theta \\ \cos\Delta\theta \end{bmatrix} - (p\Delta\theta)L_d \begin{bmatrix} -i_\delta \\ i_\gamma \end{bmatrix} \quad (28)$$

$$\begin{bmatrix} v_\gamma \\ v_\delta \end{bmatrix} = \begin{bmatrix} R_a + pL_d & -\omega L_q \\ \omega L_q & R_a + pL_d \end{bmatrix} \begin{bmatrix} i_\gamma \\ i_\delta \end{bmatrix} + E_{ex} \begin{bmatrix} -\sin\Delta\theta \\ \cos\Delta\theta \end{bmatrix} \quad (29)$$

Rewriting formula (29) with respect to the dm-qm axes gives formula (30).

$$\begin{bmatrix} v_{dm} \\ v_{qm} \end{bmatrix} = \begin{bmatrix} R_a + pL_d & -\omega L_q \\ \omega L_q & R_a + pL_d \end{bmatrix} \begin{bmatrix} i_{dm} \\ i_{qm} \end{bmatrix} + E_{ex} \begin{bmatrix} -\sin\theta_m \\ \cos\theta_m \end{bmatrix} \quad (30)$$

Here, it is assumed that formula (31) holds. Then, considering that $i_d = i_{qm} \cdot \sin\theta_m$, formula (32) holds.

$$L_{q1}i_{qm} = \sin\theta_m\{\Phi_a + (L_d - L_q)i_d\} \quad (31)$$

$$L_{q1}i_{qm} = \sin\theta_m\{\Phi_a + (L_d - L_q)i_d\} = \sin\theta_m\{\Phi_a + (L_d - L_q)i_{qm}\sin\theta_m\} \quad (32)$$

Rearranging formula (30) based on formula (32) gives formula (33). Here, $E_m$ is given by formula (34). The symbol $L_{q1}$ represents the virtual inductance that depends on $\theta_m$. Here, $L_{q1}$ is defined for the sake of convenience to handle the $E_{ex} \cdot \sin\theta_m$ present in the second term in the right side of formula (30) as the voltage drop across the virtual inductance. Incidentally, $L_{q1}$ is negative.

$$\begin{bmatrix} v_{dm} \\ v_{qm} \end{bmatrix} = \begin{bmatrix} R_a + pL_d & -\omega(L_q + L_{q1}) \\ \omega L_q & R_a + pL_d \end{bmatrix} \begin{bmatrix} i_{dm} \\ i_{qm} \end{bmatrix} + E_m \begin{bmatrix} 0 \\ 1 \end{bmatrix} \quad (33)$$

$$E_m = (\omega((L_d + L_q)i_d + \Phi_a) - (L_d - L_q)(pi_q))\cos\theta_m = E_{ex}\cos\theta_m \quad (34)$$

Now, an approximation is made such that the equation $L_m = L_q + L_{q1}$ holds (since $\theta_m$ depends on $i_q$ and $i_{qm}$, $L_{q1}$ depends on $i_q$ and $i_{qm}$; moreover, under the influence of magnetic saturation, $L_q$ also depends on $i_q$ and $i_{qm}$; the dependence of $L_{q1}$ on $i_q$ and the dependence of $L_q$ on $i_q$ are integrated into $L_m$ so that consideration is given to the influence of $i_q$ and $i_{qm}$ at the time of estimation). Now, formula (33) can be rearranged into formula (35).

$$\begin{bmatrix} v_{dm} \\ v_{qm} \end{bmatrix} = \begin{bmatrix} R_a + pL_d & -\omega L_m \\ \omega L_q & R_a + pL_d \end{bmatrix} \begin{bmatrix} i_{dm} \\ i_{qm} \end{bmatrix} + E_m \begin{bmatrix} 0 \\ 1 \end{bmatrix} \quad (35)$$

Further rearranging formula (35) gives formula (36) below. Here, $E_{exm}$ is given by formula (37) below.

$$\begin{bmatrix} v_{dm} \\ v_{qm} \end{bmatrix} = \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_m \end{bmatrix} + \omega(L_q - L_m)\begin{bmatrix} 0 & 0 \\ 1 & 0 \end{bmatrix}\begin{bmatrix} i_{dm} \\ i_{qm} \end{bmatrix} \quad (36)$$

$$= \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_m + \omega(L_q - L_m)i_{dm} \end{bmatrix}$$

$$= \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_{exm} \end{bmatrix}$$

$$E_{exm} = (\omega((L_d - L_q)i_d + \Phi_a) - (L_d - L_q)(pi_q))\cos\theta_m + \omega(L_q - L_m)i_{dm} \quad (37)$$

$$= E_m + \omega(L_q - L_m)i_{dm}$$

Suppose that there is an axis error $\Delta\theta_m$ between the γ-d axes and the dm-qm axes; then, formula (36) can be rearranged into formula (38) below. That is, just as formula (26) is rearranged into formula (28), performing coordinate conversion so that formula (36) on the dm-qm axes is converted into one on the γ-d axes gives formula (38).

$$\begin{bmatrix} v_\gamma \\ v_\delta \end{bmatrix} = \begin{bmatrix} R_a + pL_d & -\omega L_m \\ \omega L_m & R_a + pL_d \end{bmatrix} \begin{bmatrix} i_\gamma \\ i_\delta \end{bmatrix} + E_{exm}\begin{bmatrix} -\sin\Delta\theta_m \\ \cos\Delta\theta_m \end{bmatrix} - (p\Delta\theta_m)L_d\begin{bmatrix} -i_\delta \\ i_\gamma \end{bmatrix} \quad (38)$$

When approximations are made such that $p\Delta\theta_m \sim 0$, $i_{dm} \sim 0$, and $(L_d - L_q)(pi_q) \sim 0$, then $E_{exm}$ given by formula (37) is approximated by formula (39) below.

$$E_{exm} = (\omega((L_d - L_q)i_d + \Phi_a) - (L_d - L_q)(pi_q))\cos\theta_m + \omega(L_q - L_m)i_{dm} \quad (39)$$

$$\approx (\omega((L_d - L_q)i_\delta\sin\theta_m + \Phi_a) - (L_d - L_q)(pi_q))\cos\theta_m + \omega(L_q - L_m)i_{dm}$$

$$\approx \omega((L_d - L_q)i_\delta\sin\theta_m + \Phi_a)\cos\theta_m$$

Substituting $L_m = L_q + L_{q1}$ in formula (32) above, then solving the resulting formula for $\theta_m$, and then assuming that $i_d \sim i_{qm}$ gives formula (40) below. As expressed by formula (40), $\theta_m$ is a function of $i_\delta$, and accordingly $E_{exm}$ is a function of $i_\delta$.

$$\theta_m = \sin^{-1}\left(\frac{\Phi_a - \sqrt{\Phi_a^2 + 4(L_q - L_m)(L_q - L_d)i_\delta^2}}{2i_\delta(L_q - L_d)}\right) \quad (40)$$

Now, with reference to FIG. 13, a description will be given of the relationship among $E_{ex}$, $E_m$, and $E_{exm}$. Consider $E_{ex}$, $E_m$ and $E_{exm}$ as voltage vectors in a rotating coordinate system. Then, $E_{ex}$ can be called an extension induction voltage vector. The extension induction voltage vector $E_{ex}$ is an induction voltage vector on the q-axis. The extension induction voltage vector $E_{ex}$ can be broken into an induction voltage vector on the qm-axis and an induction voltage vector on the dm-axis.

As will be understood from formula (34) above, of these vectors thus broken down, the induction voltage vector on the qm-axis is $E_m$; and the induction voltage vector ($E_{ex} \cdot \sin \theta_m$) on the dm-axis, indicated by the reference numeral 80 in FIG. 13 is the voltage drop vector attributable to the virtual inductance $L_{q1}$.

As will be understood from a comparison between formulae (34) and (37), $E_{exm}$ is the sum of $E_m$ and $\omega(L_q - L_m)i_{dm}$. Thus, in the rotating coordinate system, $E_{exm}$, like $E_m$, is an induction voltage vector on the qm-axis. In maximum torque control, as described above, $i_{dm} \approx 0$, and hence $E_{exm}$ is (substantially) equal to $E_m$.

Next, with reference to FIG. 13, a description will be given of the magnetic flux corresponding to $E_{ex}$, $E_m$, and $E_{exm}$. What $E_{ex}$ represents is an induction voltage generated by the flux linkage $F_{ex}$ of the motor 1 and the rotation of the motor 1. Put the other way around, $F_{ex}$ is calculated by dividing $E_{ex}$ by $\omega$ (assuming that the transient term (the second term in the right side) of $E_{ex}$ given by formula (27) is ignored).

Consider $F_{ex}$ as a flux linkage vector in a rotating coordinate system; then, the flux linkage vector $F_{ex}$ is a flux linkage vector on the d-axis. The flux linkage vector $F_{ex}$ can be broken into a flux linkage vector on the qm-axis and a flux linkage vector on the dm-axis. Of these vectors thus broken down, the flux linkage vector on the dm-axis is represented by $F_m$, and fulfills $F_m = E_m / \omega$; the flux linkage vector ($F_{ex} \cdot \sin \theta_m$) on the qm-axis, indicated by the reference numeral 81 in FIG. 13, is a magnetic flux vector attributable to the virtual inductance $L_{q1}$.

Define $F_{exm} = E_{exm} / \omega$; then $F_{exm}$ is the sum of $F_m$ and $(L_q - L_m)i_{dm}$. Thus, in the rotating coordinate system, $F_{exm}$, like $F_m$, flux linkage vector on the dm-axis. In maximum torque control, as described above, $i_{dm} \approx 0$, and hence $F_{exm}$ is (substantially) equal to $F_m$.

Figure 15:
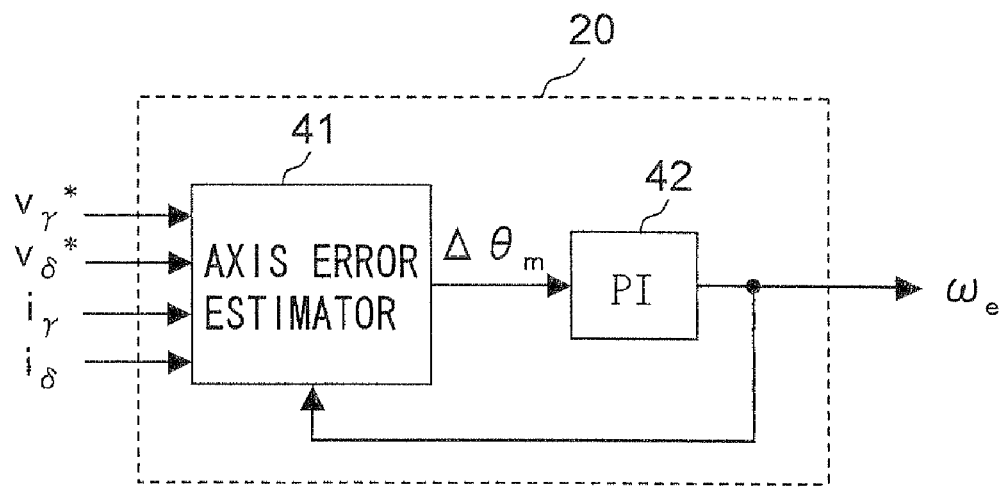
FIG. 15 is an internal block diagram of the first speed estimator shown in FIGS. 3 to 6, as observed when a dmqm method is adopted.

FIG. 15 shows an example of the internal configuration of the first speed estimator 20, as observed when the dmqm method is adopted. The first speed estimator 20 shown in FIG. 15 includes an axis error estimator 41 and a proportional-plus-integral calculator 42.

The axis error estimator 41 calculates the axis error $\Delta\theta_m$ based on all or part of $v_\gamma^*$, $v_\delta^*$, $i_\gamma$, and $i_\delta$. To achieve PLL (phase locked loop), the proportional-plus-integral calculator 42 performs proportional-plus-integral control to calculate the estimated motor speed $\omega_e$ such that the axis error $\Delta\theta_m$ calculated by the axis error estimator 41 converges to zero.

Various methods for estimating the axis error $\Delta\theta_m$ can be adopted to make the axis error estimator 41 estimate the axis error $\Delta\theta_m$. Presented below are four examples of the calculation method adopted in the axis error estimator 41.

It should be noted that, when using any formula stated in the present specification, the axis error estimator 41 substitutes the values of $v_\gamma^*$, $v_\delta^*$, and $\omega_e$ for the values of $v_\gamma$, $v_\delta$, and $\omega$ wherever they appear in the formula. It should also be noted that any description (for example, regarding how to determine the value of $L_m$) given in connection with a particular calculation method is applicable to all other calculation methods.

First Calculation Method: First, a first method for calculating the axis error $\Delta\theta_m$ will be described. In the first calculation method, the induction voltage $E_{ex}$ generated by the motor 1 is broken into an induction voltage vector on the qm-axis and an induction voltage vector on the dm-axis. Then, based on the induction voltage vector $E_{exm}$ (~$E_m$; see FIG. 13), which is the induction voltage vector on the qm-axis, the axis error $\Delta\theta_m$ is calculated, and thereby the phase ($\theta_e$) of the $\gamma$-axis, which is axis estimated for control purposes, is calculated (i.e., the rotor position is estimated).

The $\gamma$-axis and d-axis components of the induction voltage vector $E_{exm}$ are represented by $E_{exm\gamma}$ and $E_{exm\delta}$ respectively. Then, as will be clear from FIG. 13, $\Delta\theta_m = \tan^{-1}(-E_{exm\gamma}/E_{exm\delta})$ holds. Using a rearranged form of the first and second lines of formula (38) (a determinant), $\Delta\theta_m$ is given by formula (41) below (assuming that the third term in the right side of formula (38) is ignored). In formula (41), eventually, on the assumption that $\Delta\theta_m$ is small, an approximation is made such that $\tan^{-1}(-E_{exm\gamma}/E_{exm\delta}) \approx (-E_{exm\gamma}/E_{exm\delta})$.

$$\Delta\theta_m = \tan^{-1} \frac{E_{exm\gamma}}{E_{exm\delta}} \qquad (41)$$

$$= \tan^{-1} \frac{-(v_\gamma - (R_a + pL_d)i_\gamma + \omega L_m i_\delta)}{v_\delta - (R_a + pL_d)i_\delta - \omega L_m i_\gamma}$$

$$\approx -\frac{v_\gamma - (R_a + pL_d)i_\gamma + \omega L_m i_\delta}{v_\delta - (R_a + pL_d)i_\delta - \omega L_m i_\gamma}$$

When calculating $\Delta\theta_m$ according to formula (41), the axis error estimator 41 can ignore the differentiation terms $pL_d i_\gamma$ and $pL_d i_\delta$. Moreover, to calculate the value of $L_m$ needed to calculate $\Delta\theta_m$, the axis error estimator 41 uses formula (42) below. Formula (42) is obtained by substituting $i_{dm} = 0$ and formulae (43) and (44) below in formula (32) above, and then solving the resulting formula for $L_{q1}$.

$$L_m = L_q + L_{q1} \qquad (42)$$

$$= L_q + \frac{i_d\{\Phi_a + (L_d - L_q)i_d\}}{i_d^2 + i_q^2}$$

$$i_{qm} = \sqrt{i_d^2 + i_q^2} \qquad (43)$$

$$\sin\theta_m = \frac{i_d}{\sqrt{i_d^2 + i_q^2}} \qquad (44)$$

Rearranging formula (42) above using formula (45), which gives the d-axis current $i_d$ that achieves maximum torque control, and formula (43), which gives (an approximation of) the relationship among $i_d$, $i_q$, and $i_{qm}$, gives $L_m$ as a function of $i_{qm}$ (i.e., the terms of $i_d$ and $i_q$ are eliminated from the calculation formula of $L_m$). Hence, assuming that $i_q \approx i_{qm}$, the axis error estimator 41 can calculate, based on $i_q$, the value of $L_m$ given as a function of $i_{qm}$. Then, based on the $L_m$ thus calculated, the axis error $\Delta\theta_m$ is calculated according to formula (41).

$$i_d = \frac{\Phi_a}{2(L_q - L_d)} - \sqrt{\frac{\Phi_a^2}{4(L_q - L_d)^2} + i_q^2} \qquad (45)$$

Alternatively, the value of $L_m$ may be calculated by assuming that $i_q \approx i_{qm}$ and using an approximation formula that gives $L_m$ as a function of $i_q$; or different values of $L_m$ corresponding to different values of $i_d$ may be previously prepared in the form of table data so that the value of $L_m$ is determined by referring to the table data.

Figure 16:
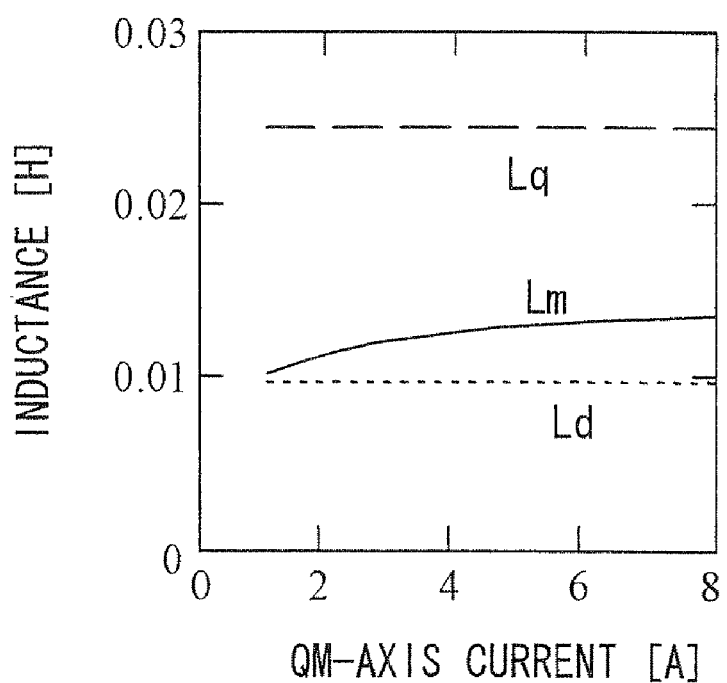
FIG. 16 is a diagram showing the relationship among motor parameters, as observed when a dmqm method is adopted.

FIG. 16 is a graph obtained in a numerical example, showing the dependence of $L_d$, $L_q$, and $L_m$ on $i_{qm}$ (assuming that $i_\gamma^* \approx 0$). As shown in FIG. 16, the value of $L_m$ depends on $i_{qm}$, and increases as $i_{qm}$ increases. The graph shows that the value of $L_m$ that achieves maximum torque control is located far closer to $L_d$ than to $L_q$.

The value of $L_m$ is so determined as to fulfill formula (46) or (47) below. This produces an intentional deviation between the d- and γ-axes, and makes $i_γ^* \sim 0$, thereby achieving control approximate to maximum torque control.

$$L_d \leq L_m < L_q \tag{46}$$

$$L_d \leq L_m < (L_d + L_q)/2 \tag{47}$$

Figure 17:
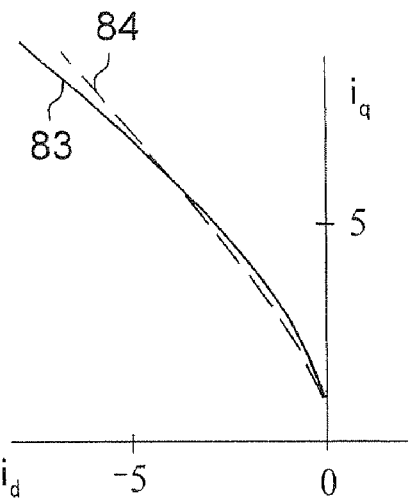
FIG. 17 is a diagram illustrating the maximum torque control realized when a dmqm method is adopted.

The value of $L_m$ may be fixed; that is, $L_m$ may be given a value that remains fixed irrespective of the value of $i_d$. In FIG. 17, a solid line 83 represents the relationship between the d-axis and q-axis currents $i_d$ and $i_q$ as observed when $L_m$ is given a predetermined fixed value, whereas a broken line 84 represents the relationship between the d-axis and q-axis currents $i_d$ and $i_q$ as observed when maximum torque control is performed in an ideal manner. FIG. 17 shows that the curves described by the solid line 83 and the broken line 84 are very similar.

Second Calculation Method: Next, a second method for calculating the axis error $\Delta\theta_m$ will be described. Also in the second calculation method, as in the first calculation method described above, the axis error $\Delta\theta_m$ is calculated based on the induction voltage vector $E_{exm}$, and thereby the phase ($\theta_e$) of the γ-axis, which is an axis estimated for control purposes, is calculated (i.e. the rotor position is estimated). In the second calculation method, however, the d-axis component $E_{exmd}$ of the induction voltage vector $E_{exm}$ is not used. Specifically, the axis error $\Delta\theta_m$ is calculated according to formula (48). In formula (48), eventually, on the assumption that $\Delta\theta_m$ is small, an approximation is made such that $\sin^{-1}(-E_{exmγ}/E_{exm}) \sim (-E_{exmγ}/E_{exm})$.

$$\Delta\theta_m = \sin^{-1}\left(\frac{-E_{exmγ}}{E_{exm}}\right) \tag{48}$$
$$= \sin^{-1}\frac{-(v_γ - (R_a + pL_d)i_γ + \omega L_m i_δ)}{E_{exm}}$$
$$\approx \frac{v_γ - (R_a + pL_d)i_γ + \omega L_m i_δ}{E_{exm}}$$

When calculating $\Delta\theta_m$ using formula (48), the axis error estimator 41 can ignore the differentiation term $pL_d i_γ$. The value of $L_m$ is determined in the same manner as in the first calculation method described above.

The value of $E_{exm}$ in formula (48) is calculated according to formula (39) above. As an approximation formula for calculating $E_{exm}$, for example, formula (49), (50), or (51) below can be used. Formula (49) approximates formula (37) by making approximations such that $p\Delta\theta_m \sim 0$, $i_{dm} \sim 0$, and $(L_d - L_q)(pi_q) \sim 0$; formula (50) further approximates formula (49) by making an approximation such that $\cos\theta_m \sim 1$; formula (51) further approximates formula (50) by making an approximation such that $(L_d - L_q)i_d \sin\theta_m << F_a$. When (49), (50), or (51) is used, $\omega_e$ is substituted for the value of $\omega$.

$$E_{exm} \approx \omega((L_d - L_q)i_δ \sin\theta_m + \Phi_a)\cos\theta_m \tag{49}$$

$$E_{exm} \approx \omega((L_d - L_q)i_δ \sin\theta_m + \Phi_a) \tag{50}$$

$$E_{exm} \approx \omega\Phi_a \tag{51}$$

The value of $\theta_m$ in formula (49) etc. is calculated according to formula (40) above. As will be understood from formula (40), $\theta_m$ is a function of $i_d$, and thus $E_{exm}$ also is a function of $i_d$. Since calculating $E_{exm}$ requires complicated calculation, it is preferable to use an appropriate approximation formula to calculate it. Alternatively, different values of $E_{exm}$ corresponding to different values of $i_d$ may be previously prepared in the form of table data so that the value of $E_{exm}$ is determined by referring to the table data.

Third Calculation Method: Next, a third method for calculating the axis error $\Delta\theta_m$ will be described. In the third calculation method, the flux linkage $F_{ex}$ produced around the armature winding of the motor 1 is broken down into a flux linkage vector on the qm-axis and a flux linkage vector on the dm-axis. Then, based on the flux linkage vector $F_{exm}$ ($\sim F_m$; see FIG. 13), which is the flux linkage vector on the dm-axis, the axis error $\Delta\theta_m$ is calculated, and thereby the phase ($\theta_e$) of the γ-axis, which is an axis estimated for control purposes, is calculated (i.e., the rotor position is estimated).

The γ-axis and d-axis components of the flux linkage vector $F_{exm}$ is represented by $F_{exmγ}$ and $F_{exmd}$ respectively. Then, as will be clear from FIG. 13, $\Delta\theta_m = \tan^{-1}(-F_{exmd}/F_{exmγ})$ holds. Here, $F_{exm}$ equals $E_{exm}$ divided by $\omega$. Accordingly, in the third calculation method, the axis error $\Delta\theta_m$ is calculated according to formula (52) below, which is a rearranged version of formula (41) used in the first calculation method. In other respects, the third calculation method is the same as the first calculation method.

$$\Delta\theta_m = \tan^{-1}\frac{-\Phi_{exmδ}}{\Phi_{exmγ}} = \tan^{-1}\left(\frac{\frac{-E_{exmγ}}{\omega}}{\frac{E_{exmδ}}{\omega}}\right) \tag{52}$$

Fourth Calculation Method: Next, a fourth method for calculating the axis error $\Delta\theta_m$ will be described. In the fourth calculation method, as in the third calculation method described above, the axis error $\Delta\theta_m$ is calculated based on the flux linkage vector $F_{exm}$, and thereby the phase ($\theta_e$) of the γ-axis, which is an axis estimated for control purposes, is calculated (i.e., the rotor position is estimated). In the fourth calculation method, however, the γ-axis component $F_{exmγ}$ of the flux linkage vector $F_{exm}$ is not used. Specifically, the axis error $\Delta\theta_m$ is calculated according to formula (53) below, which is a rearranged version of formula (48) used in the second calculation method. In other respect, the fourth calculation method is the same as the second calculation method.

$$\Delta\theta_m = \sin^{-1}\left(\frac{-\Phi_{exmδ}}{\Phi_{exmγ}}\right) = \sin^{-1}\left(\frac{\frac{-E_{exmγ}}{\omega}}{\frac{E_{exm}}{\omega}}\right) \tag{53}$$

Any calculation method other than the first to fourth calculation methods described above may be used. For example, the axis error $\Delta\theta_m$ may be calculated based on the error current between the current on the dm-qm axes (the current in the motor model) and the current on the γ-d axes.

Figure 18:
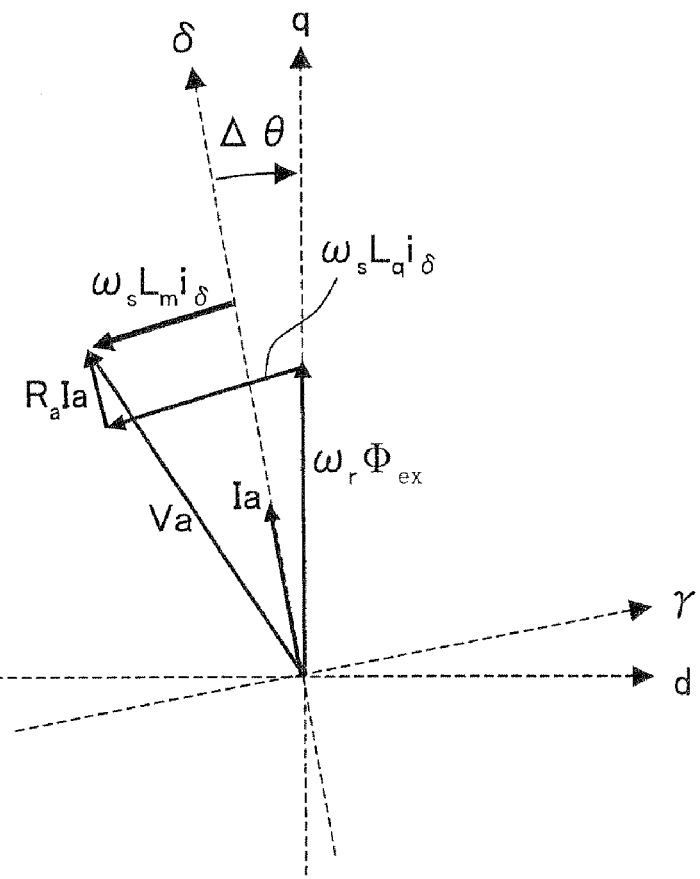
FIG. 18 is a vector diagram obtained in a synchronized state (in synchronized operation) when, for example, a dmqm method is adopted.

Next, a description will be given of how sensorless vector control is performed in case of synchronization failure. FIG. 18 is a vector diagram obtained in a synchronized state (in synchronized operation) when, for example, the dmqm method is adopted.

Here, the rotation speed (rotation angular speed) of the rotor is represented by $\omega_r$, and the rotation speed of the γ-d axis, that is, the rotation speed (rotation angular speed) of the current vector of the motor current Ia is represented by $\omega_s$. In a synchronized state, $\omega_r$ and $\omega_s$ are equal.

The motor voltage Va is given as the sum of the voltage component $\omega_r F_{ex}$ produced by the rotation of the rotor, the voltage component $R_a I_a$ produced across the motor resistance, and the voltage component $\omega_s L_q i_d$ produced by the inductance and the motor current.

When the dmqm method is adopted, the difference between $L_q$ and the estimation parameter $L_m$ constantly produces a non-zero axis error $\Delta\theta$ between the $\gamma$-axis and the d-axis. That is, an axis error $\Delta\theta$ commensurate with the difference between $L_q$ and $L_m$ is produced such that a synchronized state (synchronized operation) is maintained. In this state, as will be easily understood from the vector diagram of FIG. 18, formula (54) below holds.

$$\omega_s L_m i_\delta = \omega_s L_q i_\delta - \omega_r \Phi_{ex} \sin \Delta\theta \tag{54}$$

In a state of synchronization failure, $\omega_r$ equals 0. Thus, as will be easily understood from the vector diagram of FIG. 18, the value of the d-axis voltage in a state of synchronization failure is evidently smaller than in a synchronized state. Thus, as in the second embodiment, by estimating the d-axis voltage, it is possible to detect synchronization failure.

Instead, it is also possible to divide the d-axis voltage by $F_{ex}$ (or simply by $F_a$) to calculate $\omega_s$ and detect synchronization failure based on the thus calculated $\omega_s$. This is possible because, in case of synchronization failure, the calculated $\omega_s$ has an extremely small value. Examples of methods that exploit $\omega_s$ are presented in the first and fourth embodiments. It is also possible to detect synchronization failure by estimating the d-axis current, and an example of this method is presented in the third embodiment.

MODIFICATIONS AND VARIATIONS

Any feature of the embodiments described above can be applied, unless inconsistent, to any embodiment other than that in connection with which the feature is specifically described.

The synchronization failure checker 23, 23a, 23b, and 23c in FIGS. 3 to 6 each serve as a synchronization failure detector. In FIG. 3, the second speed estimator 22 can also be regarded as part of the synchronization failure detector. In FIG. 4, the applied voltage estimator 25 can also be regarded as part of the synchronization failure detector. In FIG. 5, the supplied current estimator 26 can also be regarded as part of the synchronization failure detector. In FIG. 6, the second speed estimator 27 can also be regarded as part of the synchronization failure detector, and the superposition voltage generator 28 and adder 30 can also be regarded as part of the synchronization failure detector.

In each embodiment, the coordinate converter 12 and 18, the subtracter 13 and 14, and the current controller 15 constitute a specified voltage value calculator; the magnetic flux controller 16, the speed controller 17, and subtracter 19 constitute a specified current calculator.

What the values $i_u$, $i_v$, $i_\gamma$, and $i_d$ fed into and out of the coordinate converter 12 represent are the values of currents as measured by the current detector (current measurer) 11, and therefore these currents can be called measured currents. The current detector 11 may be so configured as to directly detect the motor current as shown in FIG. 3 etc., or may instead be so configured as to reproduce the motor current from instantaneous currents in the supplied direct current and thereby detect motor current. Also in this case, the motor current so detected can be called as a current as measured (i.e., a measured current).

In each embodiment, the motor control device is realized, for example, with software (a program) incorporated in a general-purpose microcomputer or the like. Needless to say, the motor control device may be realized with hardware alone, instead of software (a program).

The present invention is suitable for electric devices of any kind that use a motor; for example, it is suitable for electric cars that run by exploiting the rotation of a motor, and compressors and the like used in air conditioners and the like.

Any of the different specified values ($i_\gamma{}^*$, $i_d{}^*$, $v_\gamma{}^*$, $v_d{}^*$, etc.) and other state quantities ($\omega_e$, $\omega_{2e}$, etc.) mentioned above, that is, any value that needs to be derived (or estimated) as necessary may be derived (or estimated) in any manner. That is, such values may be derived (or estimated), for example, through calculation performed within the motor control device (3, 3a, etc.), or may be derived (or estimated) from a previously set data table.

What is claimed is:

1. A motor control device comprising a first speed estimator which estimates a rotation speed of a rotor of a permanent-magnet synchronous motor, the motor control device controlling the motor so that a first estimated rotation speed estimated by the first speed estimator follows a specified speed value, the motor control device further comprising:
a second speed estimator which estimates the rotation speed of the rotor by an estimation method different from that used by the first speed estimator; and
a synchronization failure detector which detects synchronization failure in the rotor based on a second estimated rotation speed estimated by the second speed estimator and on the first estimated rotation speed or the specified speed value.

2. The motor control device of claim 1,
wherein the synchronization failure detector detects synchronization failure based on a ratio or deviation between the second estimated rotation speed and the first estimated rotation speed or the specified speed value.

3. A motor drive system comprising:
a motor;
an inverter driving the motor; and
the motor control device of claim 1, the motor control device controlling the motor by controlling the inverter.

* * * * *